United States Patent
Kudou et al.

(10) Patent No.: US 8,177,435 B2
(45) Date of Patent: May 15, 2012

(54) MANUFACTURING METHOD OF A DRAWN CUP NEEDLE ROLLER BEARING HAVING SEAL RING

(75) Inventors: Tomohiro Kudou, Takasaki (JP); Kazuto Kobayashi, Fujisawa (JP); Keiichi Horino, Fujisawa (JP); Kiyoshi Ootsuka, Fujisawa (JP); Isao Shintou, Fujisawa (JP)

(73) Assignee: NSK Ltd., Tokyo (JP)

( * ) Notice: Subject to any disclaimer, the term of this patent is extended or adjusted under 35 U.S.C. 154(b) by 729 days.

(21) Appl. No.: 12/303,817

(22) PCT Filed: Jun. 7, 2007

(86) PCT No.: PCT/JP2007/061550
§ 371 (c)(1),
(2), (4) Date: Dec. 8, 2008

(87) PCT Pub. No.: WO2007/142298
PCT Pub. Date: Dec. 13, 2007

(65) Prior Publication Data
US 2010/0054651 A1    Mar. 4, 2010

(30) Foreign Application Priority Data

Jun. 8, 2006 (JP) ................................. 2006-159699
Jan. 19, 2007 (JP) ................................. 2007-010153

(51) Int. Cl.
*B21D 53/20* (2006.01)
*F16C 33/72* (2006.01)

(52) U.S. Cl. ........................ 384/477; 29/898.11; 384/569

(58) Field of Classification Search .................. 384/477, 384/481, 559, 564, 569; 29/898.11
See application file for complete search history.

(56) References Cited

U.S. PATENT DOCUMENTS 3,924,912 A * 12/1975 Pitner ........................... 384/564
5,385,413 A *  1/1995 Murphy et al. ............... 384/564
5,419,641 A     5/1995 Fujinami
5,458,421 A * 10/1995 Giese ............................. 384/481

(Continued)

FOREIGN PATENT DOCUMENTS

DE    19849327 A1    4/2000

(Continued)

OTHER PUBLICATIONS

Chinese Office Action dated Mar. 11, 2010 in Chinese Application No. 200780021158.5.

(Continued)

*Primary Examiner* — Thomas R Hannon
(74) *Attorney, Agent, or Firm* — Sughrue Mion, PLLC

(57) ABSTRACT

A drawn cup needle roller bearing 30 having a seal ring comprises: a shell 31 having a raceway surface 31*a* on an inner circumferential face and also having inward flange portions 31*b*, 31*c* in both end portions; a cage 32 having a plurality of pockets 32*a* in a circumferential direction and worked by cutting; a plurality of needles 33 retained in the pockets 32*a* so that the needles freely rotate along the raceway surface 31*a*; and a seal ring 34, the shape of which is cylindrical, arranged inside the shell 31 between an end face 32*b* of the cage 32 and the inward flange portion 31*b*. The seal ring 34 composes a floating seal and is formed by press working. Due to the foregoing, an excellent dimensional accuracy can be provided and a quantity of lubricant passing through the bearing can be controlled.

4 Claims, 19 Drawing Sheets

U.S. PATENT DOCUMENTS

| | | | | |
|---|---|---|---|---|
| 6,109,791 | A | * | 8/2000 | Metton et al. .................. 384/569 |
| 7,661,883 | B2 | * | 2/2010 | Gresley .......................... 384/477 |

FOREIGN PATENT DOCUMENTS

| | | | |
|---|---|---|---|
| JP | 62-266224 | A | 11/1987 |
| JP | 63-151441 | A | 6/1988 |
| JP | 6-6751 | U | 1/1994 |
| JP | 6-23776 | Y2 | 6/1994 |
| JP | 6-294418 | A | 10/1994 |
| JP | 7-103337 | A | 4/1995 |
| JP | 7279952 | A | 10/1995 |
| JP | 10-61669 | A | 3/1998 |
| JP | 10213207 | A | 8/1998 |
| JP | 2000065050 | A | 3/2000 |
| JP | 2000-291669 | A | 10/2000 |
| JP | 2007-064429 | A | 3/2007 |
| WO | 2005/121578 | A1 | 12/2005 |

OTHER PUBLICATIONS

Extended European Search Report dated Jan. 4, 2010 in Application No. 07744879.3-2424.

H.S. Bawa, "Manufacturing Processes II", Tata McGraw-Hill Publishing Co. Ltd., XP002560469, pp. 115-120 (2004).

Japanese Office Action issued Aug. 30, 2011 in corresponding Japanese Patent Application No. 2007-150086.

* cited by examiner

MATERIAL METAL PLATE

PUNCHING OUT INNER DIAMETER PORTION

▨ SCRAP

BURRING

COMPRESSION FORMING

CUTTING CYLINDRICAL PORTION

IRONING INNER DIAMETER PORTION

CUTTING EXCESSIVE

IRONING AGAIN

6 FIRST INTERMEDIATE CYLINDRICAL MATERIAL

COMPRESSION FORMING

4 CYLINDRICAL PORTION

BURRING

5

2

SCRAP

PUNCHING OUT INNER DIAMETER PORTION

3

1 METAL PLATE

COIL BASE MATERIAL

10

1

34

CUTTING EXCESSIVE

7

8

6 SECOND INTERMEDIATE CYLINDRICAL MATERIAL

10

1

IRONING INNER DIAMETER PORTION

SECOND CIRCULAR HOLE 10

1

CUTTING CYLINDRICAL PORTION

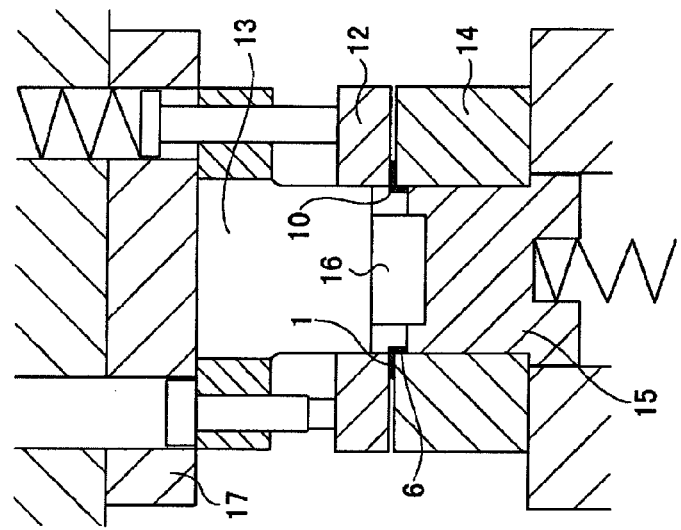
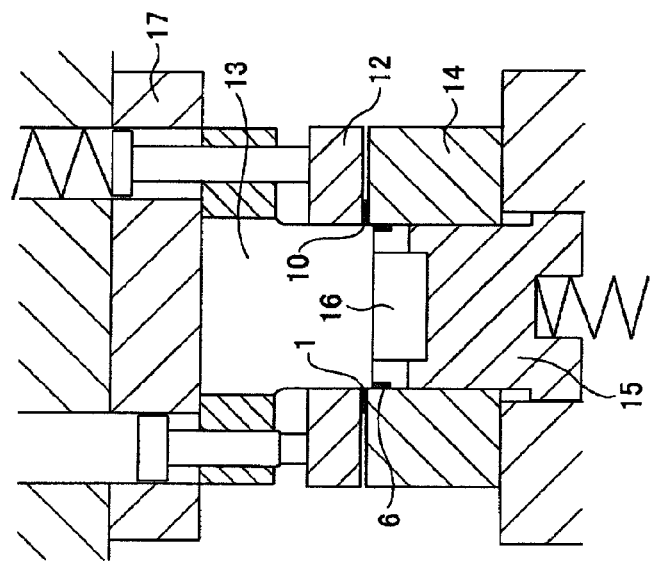
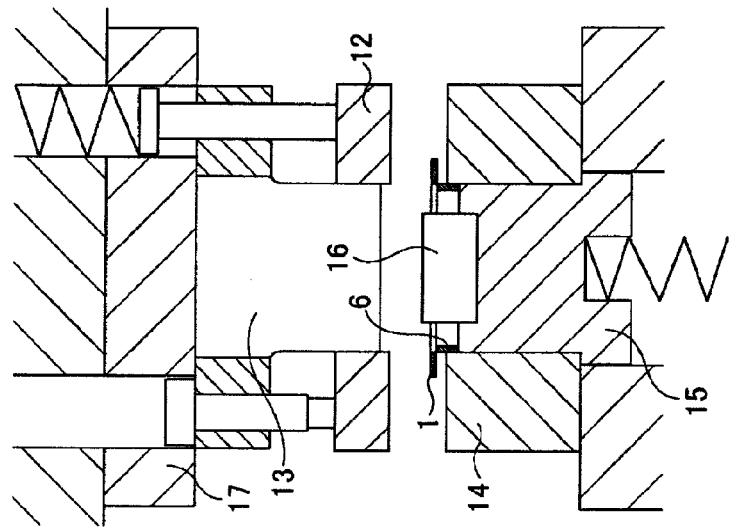

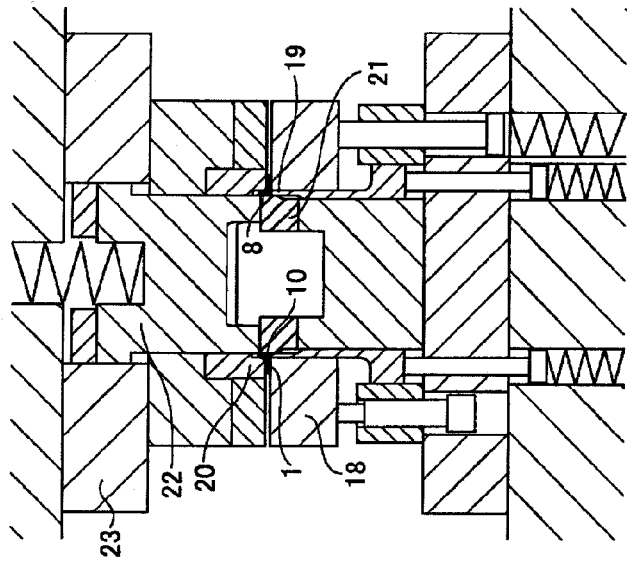
FIG. 7 (A) BEFORE WORKING
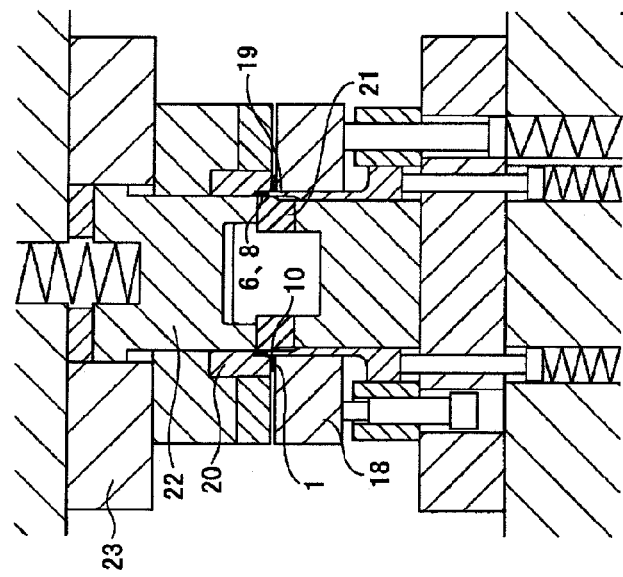
FIG. 7 (B) IN THE MIDDLE OF WORKING
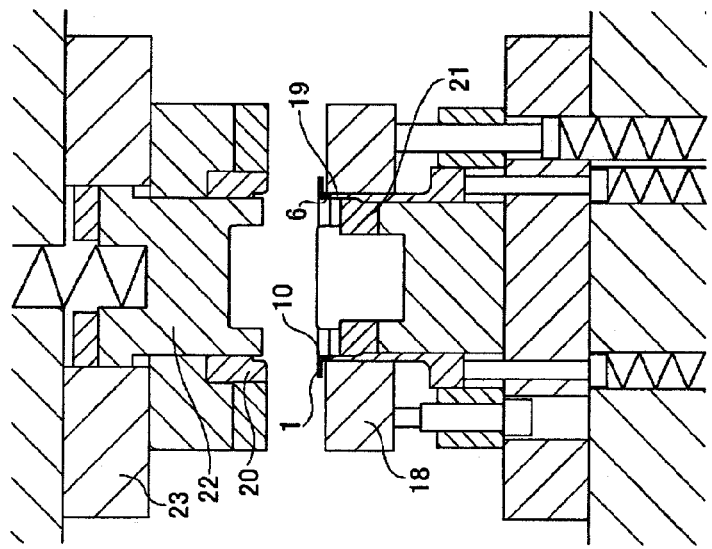
FIG. 7 (C) A RING IS RETURNED TO AN ORIGINAL POSITION OF A COIL BASE MATERIAL

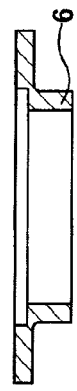
FIG. 8 (A)
COIL BASE MATERIAL
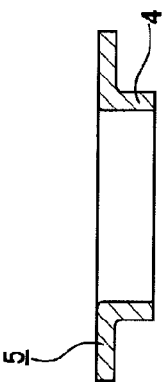
FIG. 8 (B)
PUNCHING OUT INNER DIAMETER PORTION
▨ SCRAP
FIG. 8 (C)
BURRING
FIG. 8 (D)
COMPRESSION FORMING
FIG. 8 (E)
CUTTING CYLINDRICAL PORTION
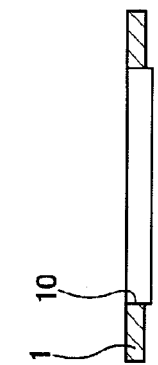
FIG. 8 (F)
IRONING INNER DIAMETER PORTION
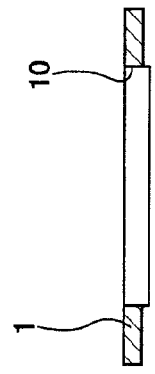
FIG. 8 (G)
CUTTING EXCESSIVE
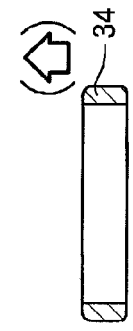

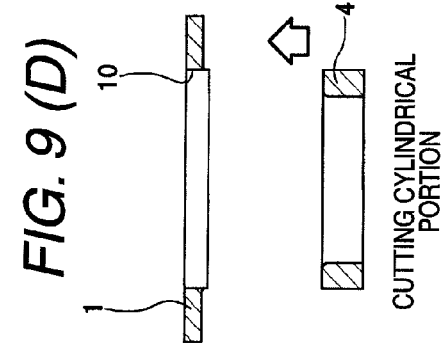
FIG. 9 (A)  COIL BASE MATERIAL
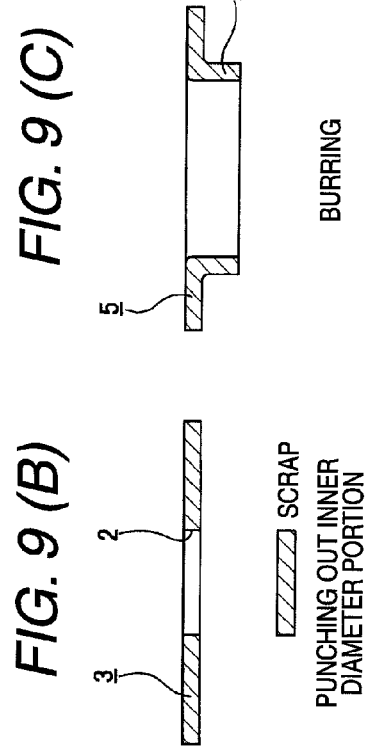
FIG. 9 (B)  PUNCHING OUT INNER DIAMETER PORTION / SCRAP
FIG. 9 (C)  BURRING
FIG. 9 (D)  CUTTING CYLINDRICAL PORTION
FIG. 9 (E)  COMPRESSION FORMING
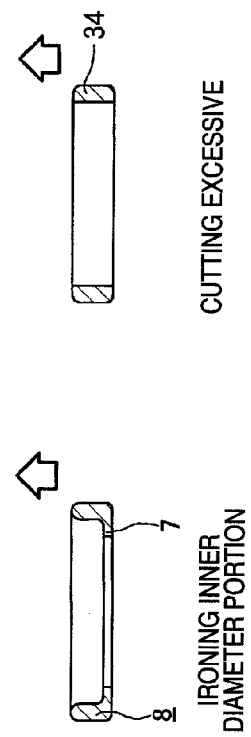
FIG. 9 (F)  IRONING INNER DIAMETER PORTION
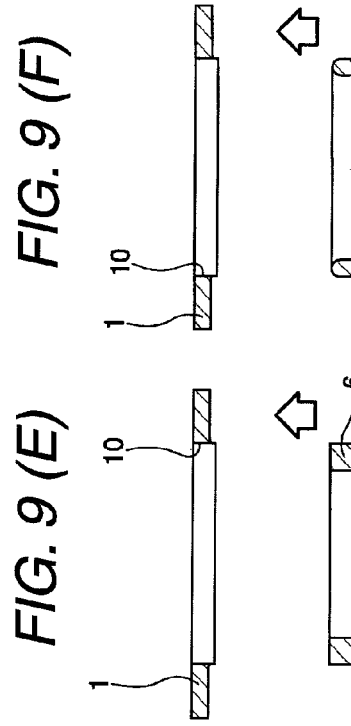
FIG. 9 (G)  CUTTING EXCESSIVE
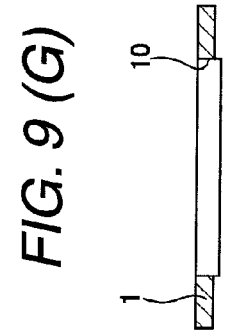

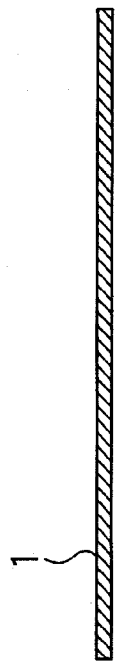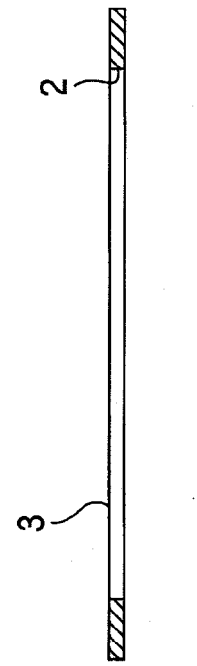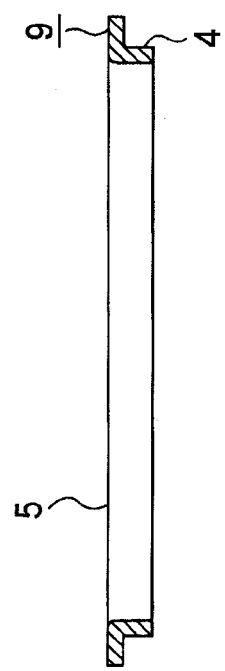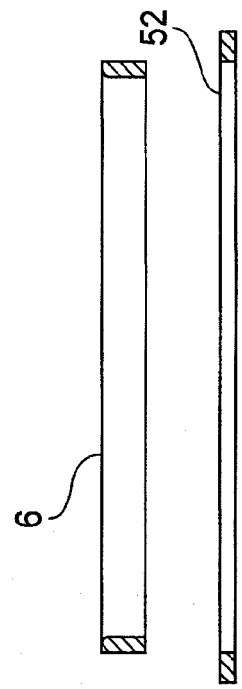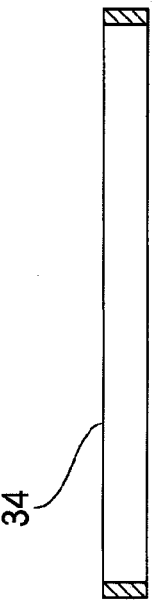

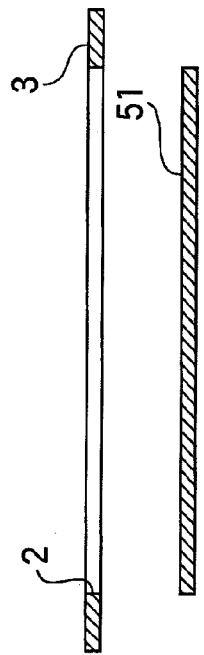
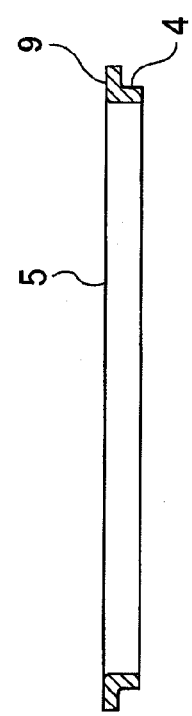
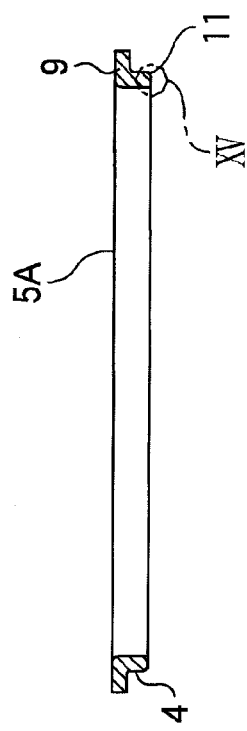
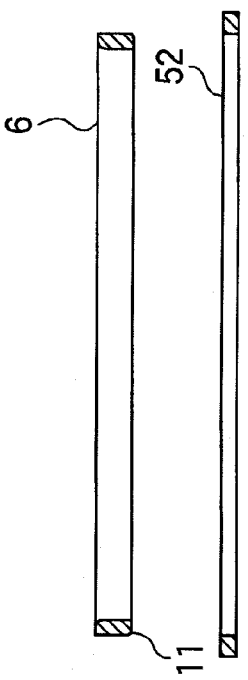
FIG. 14 (A)  FIG. 14 (B)  FIG. 14 (C)  FIG. 14 (D)  FIG. 14 (E)  FIG. 14 (F)

MANUFACTURING METHOD OF A DRAWN CUP NEEDLE ROLLER BEARING HAVING SEAL RING

TECHNICAL FIELD

The present invention relates to a drawn cup needle roller bearing having a seal ring and a manufacturing method thereof.

BACKGROUND ART

Conventionally, a large number of plain bearings (bushes) have been used for automatic transmissions. However, in order to prevent seizure caused in the bushes or to reduce torque required for the automatic transmissions, the plain bearings have been substituted by drawn cup needle roller bearings.

As the drawn cup needle roller bearing, it is known to use a drawn cup needle roller bearing, the thickness of which is reduced so that the height of the cross section of the bearing can be 1.5 to 2.5 mm, or a drawn cup needle roller bearing having a seal ring so that a quantity of lubricant passing through the needle bearing can be the same as that of the bush (For example, refer to Patent Documents 1 to 3).

Specifically, a drawn cup needle roller bearing 100 shown in FIG. 21 includes: a shell (an outer ring having a flange) 101; a cage 102; and a plurality of needles 103, wherein the height of the cross section of the bearing is approximately 1.5 mm and shaft diameter is 17 to 33 mm. A drawn cup needle roller bearing 110 shown in FIG. 22 includes: a shell 111; a cage 112; and a plurality of needles 113. The drawn cup needle roller bearing 110 further includes a seal ring 114, the height of the cross section of which is approximately 2 mm for controlling a quantity of lubricant passing through the needle bearing, wherein the height of the cross section of the bearing is 3 to 3.5 mm and the shaft diameter is 13 to 43 mm.

The seal ring 114 of the drawn cup needle roller bearing 110 shown in FIG. 22 is made by cutting working. After completing the cutting working, heat treatment is executed for preventing abrasion caused by a contact with an opponent member.

Patent Document 1; Japanese Patent Unexamined Publication JP-A-6-294418
Patent Document 2: Japanese Patent Unexamined Publication JP-A-2000-291669
Patent Document 3: Japanese Utility Model Unexamined Publication JP-UM-B-6-23776

DISCLOSURE OF THE INVENTION

Problems to be Solved by the Invention

In a meantime, the following problems may be encountered in the above drawn cup needle roller bearings. In the drawn cup needle roller bearing 100 shown in FIG. 21, it is necessary to control a quantity of lubricant passing through the needle bearing. On the other hand, in the drawn cup needle roller bearing 110 shown in FIG. 22, since the seal ring 114 is made by cutting working, it is impossible to ensure the required accuracy such as circularity of the inner diameter of the seal ring or dimensional tolerance of the inner diameter.

The present invention has been accomplished in view of the above circumstances. An object of the present invention is to provide a drawn cup needle roller bearing having a seal ring, the dimensional accuracy of which is high, capable of controlling a quantity of lubricant passing through the needle bearing.

Means for Solving the Problems (1) A drawn cup needle roller bearing having a seal ring including:
a shell having a raceway surface on an inner circumferential face or an outer circumferential face and also having flange portions in both end portions;
a cage having a plurality of pockets in a circumferential direction;
a plurality of needles retained in the pockets so that the needles freely rotate along the raceway surface; and
a cylindrical seal ring arranged inside or outside the shell between an end face of the cage and the flange portion of the cage, wherein
the seal ring composes a floating seal and is formed by press working.

(2) The drawn cup needle roller bearing having a seal ring according to (1), wherein after completing the press working on the seal ring, no heat treatment is executed for the seal ring.

(3) The drawn cup needle roller bearing having a seal ring according to (1), wherein after completing the press working on the seal ring, the seal ring is subjected to the treatment for improving abrasion resistance.

(4) The drawn cup needle roller bearing having a seal ring according to (1), wherein the cage is made of resin.

(5) A method of manufacturing a drawn cup needle roller bearing having a seal ring, the drawn cup needle roller bearing including:
a shell having a raceway surface on an inner circumferential face or an outer circumferential face and also having flange portions in both end portions;
a cage having a plurality of pockets in a circumferential direction;
a plurality of needles retained in the pockets so that the needles freely rotate along the raceway surface; and
a cylindrical seal ring composing a floating seal, arranged inside or outside the shell between an end face of the cage and the flange portion of the shell,
the method of manufacturing a drawn cup needle roller bearing having a seal ring, including the step of forming the seal ring by press working.

Advantages of the Invention

In the drawn cup needle roller bearing having a seal ring and the manufacturing method of the present invention, when the seal ring is formed by press working, it is possible to ensure high dimensional accuracy of the seal ring. Therefore, it is possible to prevent abrasion of the seal ring caused when it comes into contact with an opponent member. Further, since the needle bearing includes the seal ring, it is possible to control a quantity of lubricant passing through the needle bearing. In addition, since the seal ring is a floating seal, the torque required for the bearing can be reduced as compared with a bearing in which a contact type seal is used.

After completing the press working on the seal ring, the seal ring is not subjected to heat treatment. Accordingly, the manufacturing cost can be reduced.

Further, after completing the press working on the seal ring, the seal ring is subjected to the treatment for improving abrasion resistance. Therefore, it is possible to prevent the abrasion of the seal ring caused by a sliding contact with the flange portion provided at an end portion of the shell. Further, when nitriding is executed at a low temperature as the treatment for improving abrasion resistance, the abrasion resistance property of the seal ring can be enhanced while a deformation of the seal ring caused by the treatment for improving abrasion resistance is being prevented. Therefore, a thin seal ring can be manufactured with high accuracy.

Although the formation of pockets is difficult for a cage made of metal, especially the formation of pawls for retaining needles is difficult in the case of the cage made of metal, when the cage is made of resin, a thin cage can be easily manufactured at a low manufacturing cost.

BRIEF DESCRIPTION OF THE DRAWINGS

FIG. 2(A) shows a metallic material plate, FIG. 2(B) shows a step of punching out an inner diameter portion, FIG. 2(C) shows a step of burring, FIG. 2(D) shows a step of compressive forming, FIG. 2(E) shows a step of cutting off a cylindrical portion, FIG. 2(F) shows a step of ironing the inner diameter portion, FIG. 2(G) shows a step of cutting off excess portions and FIG. 2(H) shows a step of re-ironing.

FIG. 3(A) shows a coil base material, FIG. 3(B) shows a step of punching out an inner diameter portion, FIG. 3(C) shows a step of burring, FIG. 3(D) shows a step of compressive forming, FIG. 3(E) shows a step of cutting a cylindrical portion, FIG. 3(F) shows a step of ironing the inner diameter portion and FIG. 3(G) shows a step of cutting excess portion.

FIG. 5 is a sectional view showing a separating step and a re-fitting step successive to the separating step wherein the steps are shown in the order of progress. FIG. 5(A) is a view showing a state before working, FIG. 5(B) is a view showing a state in the middle of working and FIG. 5(C) is a view showing a state in which a ring is returned to the original state of the coil base material.

FIG. 7 is a sectional view showing an ironing step and a fitting step successive to the ironing step, wherein the steps are shown in the order of progress. FIG. 7(A) is a view showing a state before working, FIG. 7(B) is a view showing a state in the middle of working and FIG. 7(C) is a view showing a state in which a ring is returned to the original state of a coil base material.

FIG. 8 is a sectional view showing a working step of the third embodiment of a seal ring. FIG. 8(A) shows a coil base material, FIG. 8(B) shows a punching out an inner diameter portion, FIG. 8(C) shows a step of burring, FIG. 8(D) shows a step of compressive forming, FIG. 8(E) shows a step of cutting out a cylindrical portion, FIG. 8(F) shows a step of cutting the inner diameter portion and FIG. 8(G) shows a step of cutting off excess portion.

FIG. 9 is a sectional view showing a working step of the fourth embodiment of a seal ring. FIG. 9(A) shows a coil base material, FIG. 9(B) shows a step of punching out an inner diameter portion, FIG. 9(C) shows a step of burring, FIG. 9(D) shows a step of compressive forming, FIG. 9(E) shows a step of cutting off a cylindrical portion, FIG. 9(F) shows a step of ironing the inner diameter portion and FIG. 9(G) shows a step of cutting off excess portion.

FIG. 10 is a sectional view showing a working step of the fifth embodiment of a seal ring. FIG. 10(A) shows a metallic material plate, FIG. 10(B) shows a step of punching out an inner diameter portion, FIG. 10(C) shows a step of burring, FIG. 10(D) shows a step of cutting off the Cylindrical portion and FIG. 10(E) shows a step of cold rolling working.

FIG. 13(A) shows a state before the start of cold rolling working and FIG. 13(B) shows a state after the completion of cold rolling working.

FIG. 14 is a sectional view showing a working step of the sixth embodiment of a seal ring. FIG. 14(A) shows a metallic material plate, FIG. 14(B) shows a step of punching out an inner diameter portion, FIG. 14(C) shows a step of burring, FIG. 14(D) shows a step of forming a corner R portion, FIG. 14(E) shows a step of cutting off a cylindrical portion and FIG. 14(F) shows a step of cold rolling working.

FIG. 16(A) shows a state before the start of cold rolling working and FIG. 16(B) shows a state after completing the cold rolling working.

DESCRIPTION OF THE REFERENCE NUMERALS AND SIGNS

Figure 1:
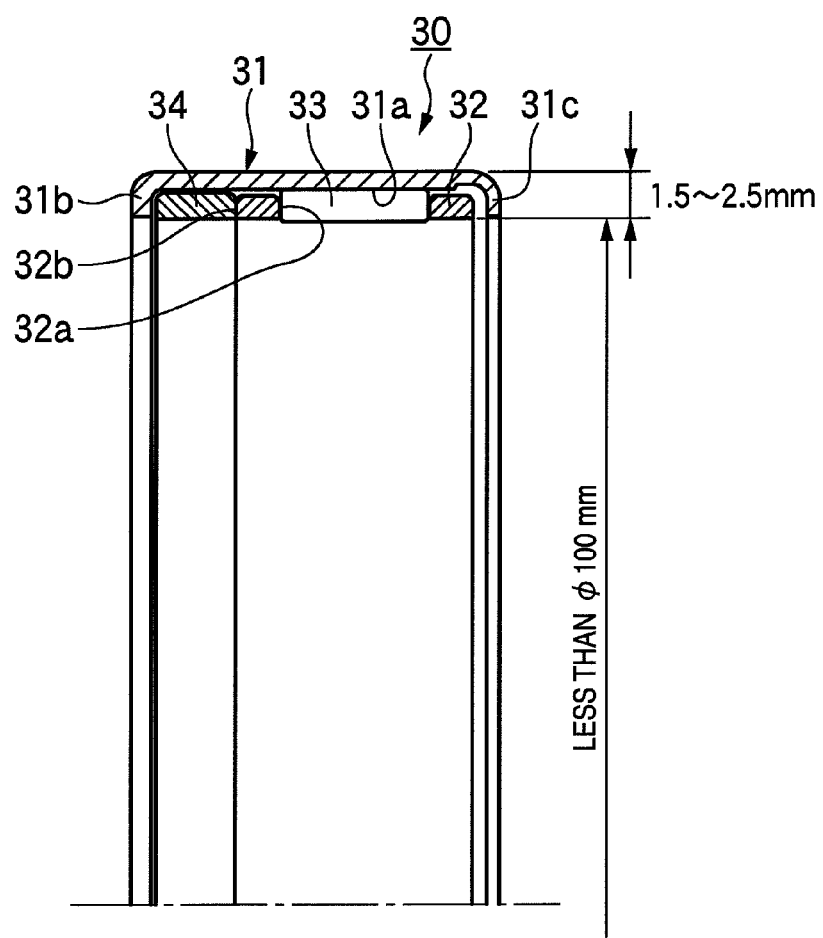
FIG. 1 is a sectional view showing a drawn cup needle roller bearing having a seal ring of an embodiment of the present invention.

30 Drawn cup needle roller bearing having seal ring
31 Shell
31a Raceway surface
31b, 31c Inward flange portion (flange portion)
32 Cage
32a Pocket
32b End face of cage
33 Needle
34 Seal ring

BEST MODE FOR CARRYING OUT THE INVENTION

Referring to the drawings, the drawn cup needle roller bearing having a seal ring of an embodiment of the present invention will be explained in detail as follows.

The drawn cup needle roller bearing 30 having a seal ring is arranged between gear trains in an automatic transmission or between a gear shaft and a housing, or on the side of an oil pump gear. As shown in FIG. 1, this drawn cup needle roller bearing 30 includes: a shell (an outer ring having a flange) 31; a cage 32; a plurality of needles 33; and a cylindrical seal ring 34, and rotatably supports a shaft (or an inner ring member) not shown.

The shell 31 includes: a raceway surface 31a provided on the inner circumferential face; and inward flange portions 31b, 31c provided at both end portions. The cage 32 includes a plurality of pockets 32a arranged in the circumferential direction.

Here, the cage 32 is made of metal, the metal is steel such as SPCC, S10C, AISI-1010, SCM415, SK5 or SUJ2 and is machined by means of welding, press working or cutting. The cage 32 may be subjected to the heat treatment of carbonitriding or salt bath soft nitriding (Tufftride) in the same manner as that of the conventional method. However, in the case of a thin cage applied to a needle bearing of a shaft diameter of 40 mm or more, there is a possibility that the needle 33 gets into a space between the raceway surface 31a and the outer diameter face of the cage 32 due to a deformation caused by the heat treatment executed for the cage 32. Therefore, in order to prevent the deformation caused by the heat treatment, the cage 32 is subjected to Tufftride SQ (single quench) or NV nitriding.

When the cage 32 is made of resin, it is possible to apply polyamide 46, polyamide 66 or PPS (polyphenylene sulfide) to the cage 32. Polyamide 46 can be continuously used at a temperature of 150° C. and also, can be used at a temperature of 170° C. for an instant. Polyamide 66 can be used at a temperature of 120° C. PPS can be used at a temperature of 200° C. In order to enhance the mechanical strength, glass fiber is mixed in each resin material by 20 to 30%.

When the height of the cross section of the drawn cup needle roller bearing 30 is approximately 1.5 to 2.5 mm, the thickness of the cage is small and 1 mm or less. By forming the thin cage by the resin as described above, pockets and pawls for retaining the needles can be easily formed as compared with the cage made of metal.

For example, in the cage 32 made of resin, the inner diameter of which is 45 mm, the accurate circularity is required. In order to manufacture a cage made of resin with high accuracy, it is effective to execute annealing after performing an injection molding of the cage.

The needle 33 is retained in each pocket 32a of the cage 32 being capable of freely rolling so that the needle 33 can freely rotate along the raceway surface 31a of the shell 31. Crowning working is performed on both end portions of the needle 33.

The seal ring 34 is made of steel such as SPCC, SPCE or SUJ2. The seal ring 34 is arranged between the end face 32b of the cage 32 and the inward flange portion 31b of the shell 31, which is on a downstream side of a flow of the lubricant inside the shell and regulates a quantity of lubricant passing through the needle bearing 30. The seal ring 34 may be made of non-ferrous metal such as copper, copper alloy, aluminum or aluminum alloy, as necessary. Further, it the following working method of the embodiment is used, the seal ring 34 is preferably made of SPCC or SPCE. The seal ring 34 is a floating seal, of which outer diameter is slightly larger than the outer diameter of the shaft and slightly smaller than the inner diameter of the shell 31.

The drawn cup needle roller bearing 30 is made thin as follows. The height of the cross section of the needle bearing is 1.0 to 3.5 m, preferably 1.5 to 2.5 mm and more preferably 1.5 to 2.0 mm and the shaft diameter is preferably 100 mm or less. The height of the cross section of the seal ring 34 arranged in the shell 31 is 0.8 to 1.8 mm. The seal ring 34 having the dimensions and shape described above is formed by means of press working (in the embodiment, dimension regulating step, punching step, and re-punching step, which are described later) or cold rolling working. Thus, the surface hardness is improved due to working hardening. Therefore, the seal ring 34 can be manufactured without executing the heat treatment such as quenching and tempering as a later process. Accordingly, the dimensional accuracy of the seal ring 34 is high without being deformed by the heat treatment. As necessary, for example, according to the condition in which the drawn cup needle roller bearing 30 is used, the seal ring 34 may be subjected to the treatment for improving abrasion resistance such as nitriding.

Specifically, the seal ring 34 is made by the following working method.

First Working Method

In this working method, first, as shown in FIG. 2(A), a metal plate 1 made of mild steel or stainless steel, which is a material of the seal ring, is subjected to piercing working and a first preliminary intermediate material 3 having a circular hole 2 is obtained as shown in FIG. 2(B). Next, this first preliminary intermediate material 3 is subjected to burring working in which the periphery of the circular hole 2 is bent so as to be right angle with respect to the metal plate 1 all over the circumference. Due to the foregoing, a second preliminary intermediate material 5 having a cylindrical portion 4 is obtained as shown in FIG. 2(C). A volume of this cylindrical portion 4 is larger than a volume of the seal ring to be manufactured. Especially, a length in the axial direction of this cylindrical portion 4 is longer than a length in the axial direction of the seal ring to be manufactured.

The cylindrical portion 4 of the above second preliminary intermediate material 5 is subjected to plastic working in the successive dimension regulating step and this cylindrical portion 4 is made into a first intermediate cylindrical material 6 shown in FIG. 2(D). In the above dimension regulating step, the working is executed as follows.

In a state that an outer circumferential face of the cylindrical portion 4 is held by a die (not shown) having a circumferential inner circumferential face having a predetermined inner diameter and also the inner circumferential face of the cylindrical portion 4 is not held, the cylindrical portion 4 is pressed (axially compressed while plastic deformation) in an axial direction to become a desired dimension, that is, an axial dimension of the seal ring to be manufactured, between a pair of flat faces (e.g., receiving step portion formed on the inner circumferential face of an end portion of the die and a forward end face of a pushing die inwardly fitted to the die) which are arranged coaxially and move axially so as to approach/separate to each other.

Accompanying with thus performed plastic deformation in which axially compressed, the outer diameter and axial dimension of the cylindrical portion 4 are regulated to predetermined values. Further, the excessive portion is swelled radially inward and a first inter mediate cylindrical material is obtained. An inner diameter of the first intermediate cylindrical material 6 is smaller than an inner diameter of the seal ring to be manufactured.

Figure 2:
FIG. 2 is a sectional view showing a working step of the first embodiment of a seal ring.
Figure 2:
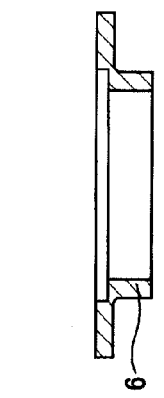
Figure 2:
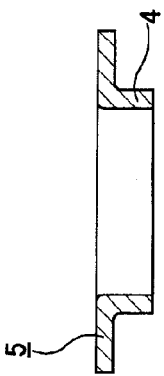
Figure 2:
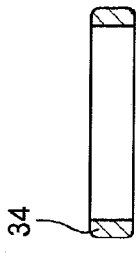
Figure 2:
Figure 2:
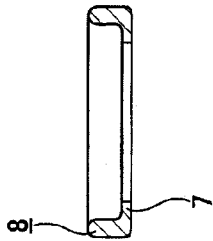
Figure 2:
Figure 2:
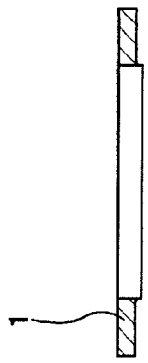
Figure 3:
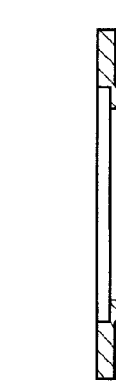
FIG. 3 is a sectional view showing a working step of the second embodiment of a seal ring.
Figure 3:
Figure 3:
Figure 3:
Figure 3:
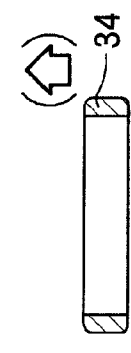
Figure 3:
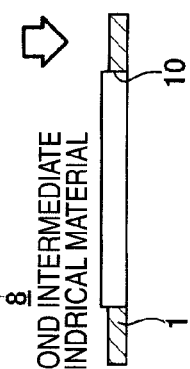
Figure 3:
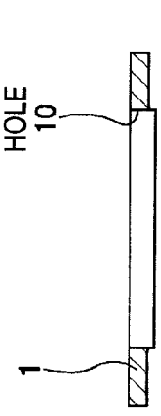

In the embodiment shown in FIG. 2, as shown in FIG. 2(E), after forming the first intermediate cylindrical material 6, the cut-off step is executed so as to cut off the first intermediate cylindrical material 6 from the metal plate 1. This cut-off step is executed by punching working by using a press machine.

The first intermediate cylindrical material 6, which has been cut off from the metal plate 1, is successively subjected to ironing working in which the inner diameter size is expanded to a proper value (an inner diameter size of the seal ring to be manufactured). In this ironing step, while an outer circumferential face of the first intermediate cylindrical material 6 is being restricted so that the outer diameter does not expand, an ironing punch having proper outer diameter (which agrees with the inner diameter of the seal ring to be manufactured) is pushed into from axially one side at radially inner side of the first intermediate cylindrical material 6. By pushing the ironing punch, the excessive portion exist on the inner circumferential face portion of the first intermediate cylindrical material 6 is collected to axially other end side (lower side of FIG. 2(F)), and a second intermediate cylindrical material 8 having an inwardly flange-shaped excessive flange portion 7 formed on the inner circumferential face of the axially other end portion, as shown in FIG. 2(F), is formed.

This second intermediate cylindrical material 8 is sent to the next excessive removing step and the excessive flange portion 7 is removed. In this excessive removing step, when a punch having proper outer diameter (which agrees with the inner diameter size of the seal ring to be manufactured) is inserted into the second intermediate cylindrical material 8, the excess flange portion 7 is removed and the seal ring 34 shown in FIG. 2(G) is obtained.

Here, this working of the seal ring 34 can be completed at the stage shown in FIG. 2(G). However, when it is difficult to attain the inner diameter or to attain the property of the inner circumferential face of the seal ring 34 at the stage of FIG. 2(G), as shown in FIG. 2(H), re-ironing working may be executed in which the inner circumferential face of the seal ring 34 is rubbed by an ironing jig.

In any case, the seal ring 34 obtained as described above is sent to a step, which is different from the step of the present invention, in which a predetermined working is executed for the seal ring 34. Concerning the seal ring 34 sent to the different step as described above, the outer diameter, axial dimension and inner diameter are respectively regulated at proper values. Therefore, it is unnecessary to cut the axially end portion by lathe turning working. Further, it is unnecessary to execute working such as extruding requiring a strong working force. Therefore, the manufacturing cost of the seal ring 34 can be reduced.

According to the working method of the first embodiment described above, the seal ring 34 having the inner diameter, outer diameter and axial dimension which are regulated at proper values, can be industrially mass-produced in low cost. Furthermore, it is possible to manufacture the seal ring 34 by a working device of which running cost is low. In the seal ring 34 obtained, the outer diameter and axial dimension are regulated at proper values in the dimension regulating step and the inner diameter is regulated at a proper value by the ironing step and the excessive removing step. Accordingly, a highly accurate seal ring 34 can be obtained in which the dimensions are regulated at proper values without cutting off the axially end portion by lathe turning.

Working Method of the Second Embodiment

FIGS. 3 to 7 are views showing the working method of the second embodiment. In the present embodiment, when the steps shown in FIGS. 3(A) to 3(G) are executed in order, the metal plate 1 is worked into the seal ring 34. These steps are substantially the same as those of the working method of the first embodiment. Even in the present embodiment, the re-ironing step shown in FIG. 2(H) can be executed. The present embodiment is characterized as follows. As the metal plate 1 described above, a long metal plate is used which is delivered from an uncoiler not shown and wound up by a recoiler not shown, so that the steps of FIGS. 3(A) to 3(G) can be successively executed in this order. While the long metal plate 1 is being synchronized with the progress of working and intermittently fed at a pitch (interval/pitch=integer) corresponding to the interval between the working devices arranged adjacent to each other so as to execute each step, the steps shown by FIGS. 3(A) to 3(G) are executed in order.

Therefore, in the present embodiment, in any step shown by FIGS. 3(A) to 3(G), without cutting off the long metal plate 1 all over the width, the long metal plate 1 is successively fed according to the progress of the working of the seal ring 34. The width size of the metal plate 1 is ensured so that both end portions in the width direction of the metal plate 1 can be left being connected with each other even in a state in which the second circular hole 10, which is larger than the circular hole 2 shown in FIG. 3(B), is formed on the long metal plate 1 brought out from the uncoiler in the cut-off step shown in FIG. 3(E) (the width size>the diameter of the second circular hole 10). After the first intermediate cylindrical material 6 (and the second intermediate cylindrical material 8 made in the following steps), which has been punched out from the inside of the second circular hole 10 in the above cut-off step, is subjected to a predetermined working, it is fit into the inside of the second circular hole 10 again. Then, the first intermediate cylindrical material 6 is sent to a working device for executing the next working in accordance with the feed of the metal plate 1. As described before, the steps shown in FIGS. 3(A) to 3(G) are the same as the steps shown in FIGS. 2(A) to 2(G) described before. Therefore, the redundant explanations are omitted here and to fit the first intermediate cylindrical material 6 into the inside of the second circular hole 10 again (re-fitting step) so that the steps shown in FIGS. 3(A) to 3(G) can be successively executed in order will be mainly explained below.

Figure 4:
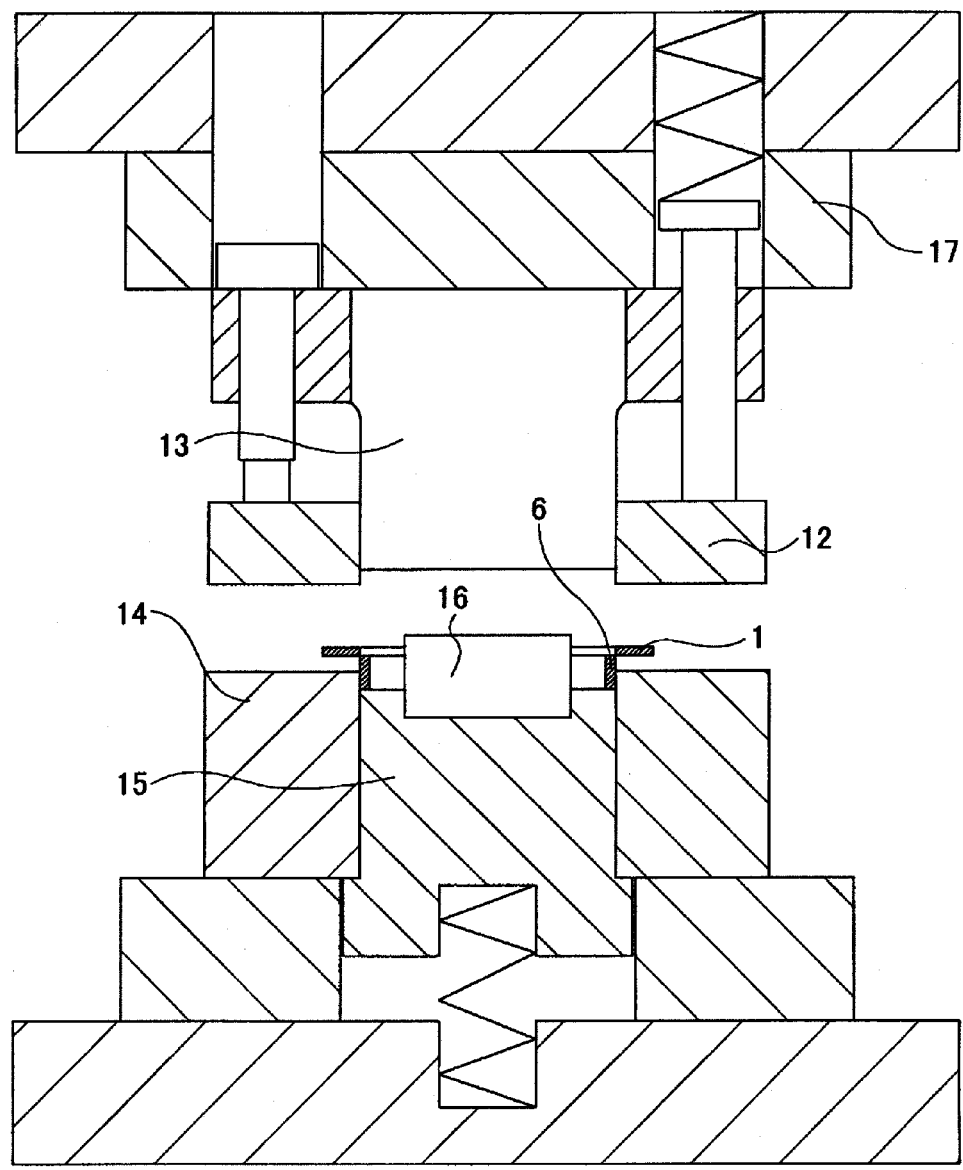
FIG. 4 is a sectional view showing a press device used for a separating step and a successive re-fitting step in the second embodiment.

The cut-off step and the re-fitting step shown in FIG. 3(E) are executed by the working device shown in FIG. 4. In the working device shown in FIG. 4, while the metal plate 1 is being pressed between an upper face of the cylindrical die 14 and a lower face of the presser die 12, which elevates under the condition that a downward elastic force is given, the first intermediate cylindrical material 6 is pushed into the die 14 by the punch 13, so that the first intermediate cylindrical material 6 is cut off from the metal plate 1. On the inner diameter side of the die 14, the push-back die 15, which is given an upward elastic force, is provided, so that the first intermediate cylindrical material 6 can be given an upward elastic force. However, a push-back die 15 is retreated downward at the time of lowering the punch 13 when a collision block 16 provided in the central portion on the upper face collides with a lower end face of the punch 13.

The cut-off step and the re-fitting step shown in FIG. 3(E), in which the working device shown in FIG. 4 is used, are executed in the order of FIGS. 5(A) to 5(C). First, as shown in FIG. 5(A), the first intermediate cylindrical material 6, which is still connected to the metal plate 1, is inwardly fitted to an upper end portion of the die 14. Next, together with a ram 17 composing the working machine, the presser die 12 and the punch 13 are lowered. As shown in FIG. 5(B), while the metal plate 1 is being held between a lower face of the presser die 12 and an upper face of the die 14, the first intermediate cylindrical material 6 is pushed into the die 14 by the punch 13.

As a result, the first intermediate cylindrical material 6 is cut off from the metal plate 1 and at the same time the second circular hole 10 is formed on the metal plate 1. When the presser die 12 and the punch 13 are raised together with the ram 17 after the first intermediate cylindrical material 6 has been cut off from the metal plate 1, as shown in FIG. 5(C), the push-back die 15r which has been lowered being pushed by the punch 13, is raised. As a result, the first intermediate cylindrical material 6 is pushed into the second circular hole 10 by this push-back die 15 and held inside the second circular hole 10. When the metal plate 1 is moved at this time, the first intermediate cylindrical material 6 is sent to the next ironing step and the re-fitting step shown in FIG. 3(F).

Figure 6:
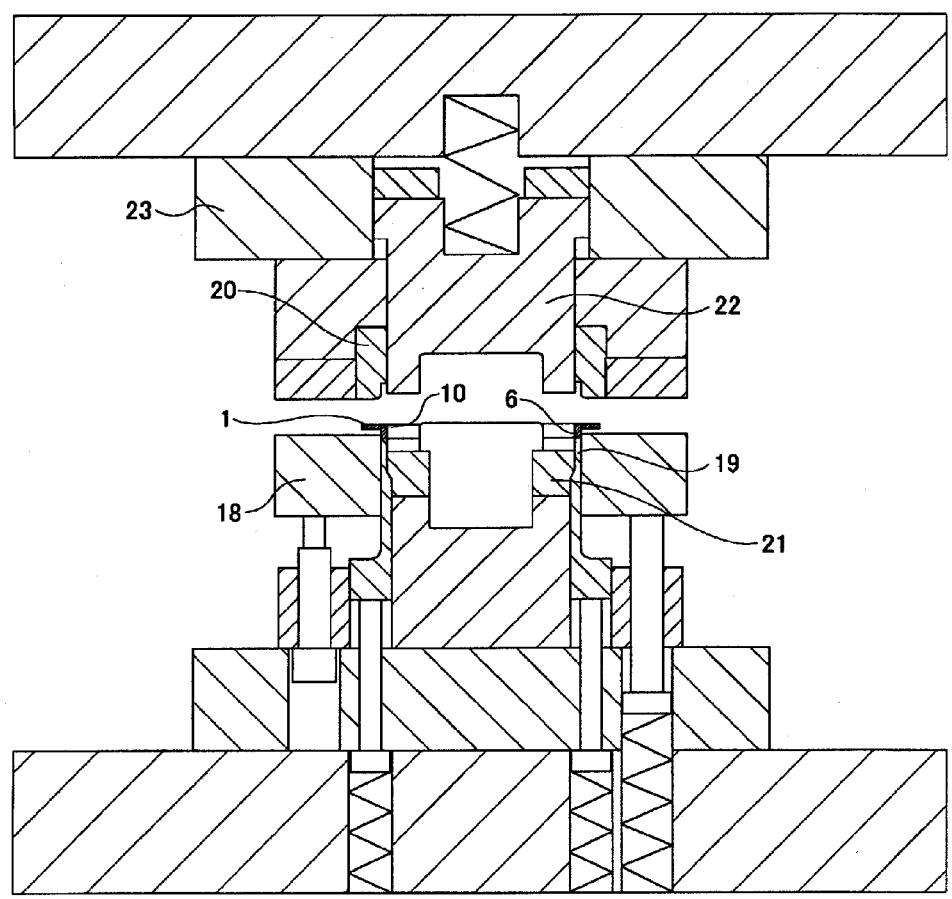
FIG. 6 is a sectional view showing a press device used for an ironing step and a re-fitting step successive to the ironing step in the second embodiment.

The ironing step and the re-fitting step shown in FIG. 3(F) are executed by the working device shown in FIG. 6. In the working device shown in FIG. 6, the metal plate 1 is pressed between an upper face of the receiving die 18, which is given an upward elastic force, and a lower face of a elevating cylindrical ironing die 20. By the ring punch 19, the first intermediate cylindrical material 6 is pushed into the ironing die 20. The ring punch 19 is arranged on the inner diameter side of the receiving die 18 being capable of elevating independently from the receiving die 18 and given an upward elastic force. Onto the inner diameter side of the ring punch 19, an ironing punch 21, which irons an inner circumferential face of the first intermediate cylindrical material 6 so that the first intermediate cylindrical material 6 can be formed into the second intermediate cylindrical material 8, is fixed. The ring punch 19 is arranged so that it can be elevated in the periphery of this ironing punch 21. An amount of the maximum lift is restricted by an engagement of the inner circumferential face of the ring punch 19 with the outer circumferential face of the ironing punch 21. Specifically, as shown in FIGS. 6 and 7(A), the amount of the maximum lift is set so that an upper end edge of the ring punch 19 can be located at a position a little lower than an upper face of the receiving die 18 under the condition that the receiving die 18 is elevated at the highest position. On the inner diameter side of the die 20, a push-back die 22, which is given a downward elastic force, is arranged.

The ironing step and the push-back step shown in FIG. 3(F), in which the working device shown in FIG. 6 described above is used, are executed in the order of FIGS. 7(A) to 7(C). First, as shown in FIG. 7(A), the first intermediate cylindrical material 6, which is held inside the second circular hole 10, is inwardly fitted to an upper end portion of the above receiving die 18 and its end face is made to collide with an upper end edge of the ring punch 19. Next, as shown in FIG. 7(B), a ram 24 composing the above working machine, the ironing die 20 and the push-back die 22 are lowered, the metal plate 1 is pushed downward by a lower face of this ironing die 20, and the first intermediate cylindrical material 6 is pulled out upward from the second circular hole 10 and then sent to the inner diameter side of the ironing die 20 by the ring punch 19. Onto the inner diameter side of the first intermediate cylindrical material 6 which has been sent onto the inner diameter side of the ironing die 20, the ironing punch 21 is pushed when the ironing die 20 is further lowered together with the ram 23.

As a result, an inner diameter of the first intermediate cylindrical material 6 is regulated at a predetermined size and the excess portion is collected to an upper end portion on the inner circumferential face. The first intermediate cylindrical material 6 is formed into the second intermediate cylindrical material 8, at the upper end portion on the inner circumferential face of which the excessive flange portion 7 shown in FIG. 3(F) is formed.

After the second intermediate cylindrical material 8 has been formed as described above, the ironing die 20 is raised together with the ram 23. Then, the metal plate 1, which has been lowered being pushed by this ironing die 20, is raised together with the receiving die 18 and at the same time the push-back die 22 is lowered with respect to the ironing die 20. At this timer this push-back die 22 pushes downward the excessive flange portion 7 shown in FIG. 3(F) which has been just formed on the inner circumferential face of the upper end portion of the second intermediate cylindrical material 8. Therefore, the second intermediate cylindrical material 8 is pushed into the second circular hole 10 and held inside the second circular hole 10.

When the metal plate 1 is moved, the second intermediate cylindrical material 8 is sent to the next excessive removing step and the push-back step shown in FIG. 3(G). Here, when the re-ironing step shown in FIG. 2(H) is executed after completing the excessive removing step shown in FIG. 3(G), the seal ring 34 obtained in this excessive removing step is pushed back into the second circular hole 10 on the metal plate 1 in the push-back step. On the other hand, in the case where the seal ring 34 obtained in the excessive removing step is sent to a step in which a predetermined working is executed for this seal ring 34 differently from the present invention, the push-back step described above can be omitted, that is, the seal ring 34, which has been separated from the metal plate in FIG. 3(G), can be taken out as it is.

In the present embodiment configured as described above, in addition to the action and effect obtained in the first embodiment, it is possible to industrially mass-produce needle bearings by a continuous working device of which running cost is inexpensive. In the present embodiment, the metal plate 1 is a long metal plate 1 delivered from an uncoiler and wound round a recoiler. The first and the second cylindrical intermediate material 6, 8, which have been cut off from the metal plate 1 in the cut-off step, are pushed again inside the second circular hole 10 on the metal plate 1. Therefore, the intermediate materials 6, 8 can be sent to the next working step together with the metal plate 1. That is, as compared with the transfer working, it is possible to reduce the equipment investment. Further, it is possible to execute a successively feeding working, the working efficiency of which is high, that is, the working cycle time of which is short. Therefore, the working cost of the seal ring 34 can be more reduced.

Working Method of the Third Embodiment

FIG. 8 is a view showing a working method of the third embodiment. In this embodiment, in the ironing step and the push-back step shown in FIG. 8(F), a direction, in which the second cylindrical intermediate material 8 is pulled out from the second circular hole 10 on the metal plate 1 and fitted into the second circular hole 10 again, is upside down with respect to the metal plate 1 when it is compared with the working method of the second embodiment. When the direction is reversed as described above, of course, the constitution of the working device shown in FIGS. 6 and 7 is made different. The constitution of the other portions is the same as that of the working method of the second embodiment described before. Therefore, the redundant explanations are omitted here.

Working Method of the Fourth Embodiment

FIG. 9 is a view showing a working method of the fourth embodiment. In this embodiment, after the burring step shown in FIG. 9(C), the cut-off step and the push-back step shown in FIG. 9(D) are set. The constitution of the other portions is the same as that of the working method of the second embodiment described before. Therefore, the redundant explanations are omitted here. In short, when executing the present invention, as long as the cut-off step is executed after the burring step, the cut-off step can be set at an arbitrary timing when consideration is given to the easiness of the working and the ensuring the accuracy of working.

In the drawn cup needle roller bearing 30 having a seal ring of the present embodiment, when the seal ring 34 is formed by press working, it is possible to ensure high dimensional accuracy of the seal ring 34. Therefore, it is possible to prevent abrasion of the seal ring caused when it comes into contact with an opponent member. Since the needle bearing includes the seal ring 34, it is possible to control a quantity of lubricant passing through the needle bearing. Since the seal ring 34 is a floating seal, torque required for the bearing can be reduced as compared with a bearing in which a contact type seal is used. In this connection, it is preferable that the seal ring 34 is 1.0 to 2.5 mm in the height of the cross section of the bearing because the thickness of the bearing can be reduced.

Especially, the heat treatment is not executed for the seal ring 34 after the seal ring 34 has been formed by press working. Therefore, the manufacturing cost can be reduced.

Working Method of the Fifth Embodiment

In the working method of the seal ring of the present embodiment, when the long metal plate drawn out from the uncoiler is punched into a circular shape by a press working, the metal plate 1 shown in FIG. 10(A) is formed.

Next, as the first step, when a central portion of the metal plate 1 is punched by means of punching working executed by a press, an annular first preliminary intermediate material 3 shown in an upper stage of FIG. 10(B) is formed. A disk-shaped scrap 51 shown in a lower stage of FIG. 10(B), which is generated as a result of punching, is discarded or utilized as material for making a smaller seal ring.

In the second step, the first preliminary intermediate material 3 is subjected to burring working in which a portion close to the inner diameter of the first preliminary intermediate material 3 is bent in the axial direction at a right angle. As well known in the field of metal working, this burring is executed in such a manner that a punching die is pushed into a portion close to the inner diameter of the first preliminary intermediate material 3 while holding a portion close to the outer diameter of the first preliminary intermediate material 3 from both sides by a pair of presser dies. When the burring described above is executed, obtained is a second preliminary intermediate material, of which cross section is an L-shape, of which entire shape is annular, which has the cylindrical portion and an outward flange portion 9 which is bent radially outward from one axially end portion of the cylindrical portion 4 as shown in FIG. 10(C).

According to the working method of the seal ring of the present invention, a highly accurate thin ring is formed out of the cylindrical portion 4 of the second preliminary intermediate member 5. On the other hand, a portion of the above outward flange portion 9 existing outside in the radial direction with respect to the outer circumferential face of this cylindrical portion 4 is discarded as an annular scrap 52 (refer to a lower stage of FIG. 10(D)) in the third step described later.

Next, in the successive third step, the second preliminary intermediate material 5 is subjected to punching working by a press working so as to remove the outward flange portion 9 and the first intermediate cylindrical material 6, which is shown in an upper stage of FIG. 10(D), is obtained. An outer diameter of the first intermediate cylindrical material 6 coincides with the outer diameter of the seal ring 34 to be manufactured.

Figure 11:
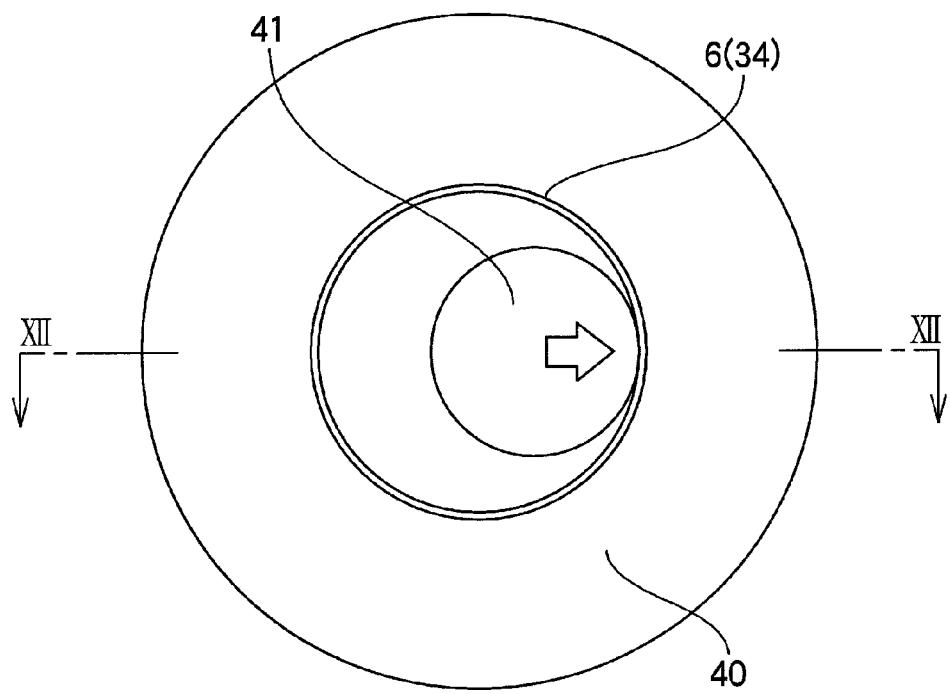
FIG. 11 is a side view showing a state in which cold rolling working is executed.
Figure 12:
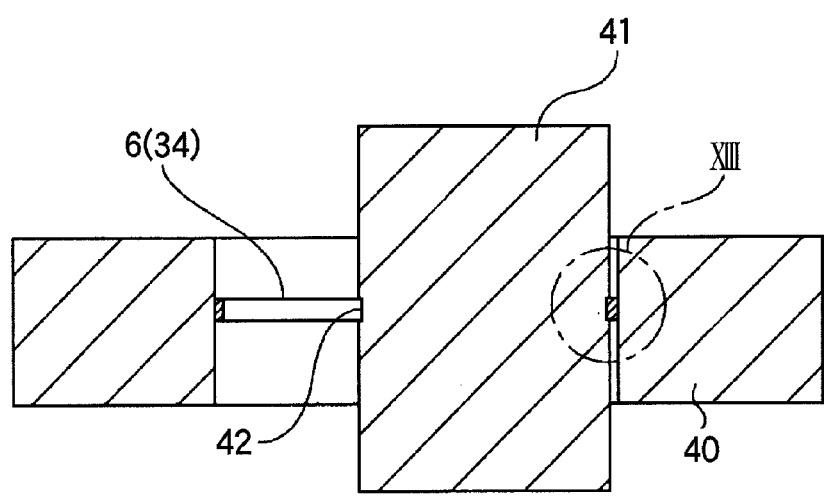
FIG. 12 is a sectional view taken on line XII-XII in FIG. 11.
Figure 13:
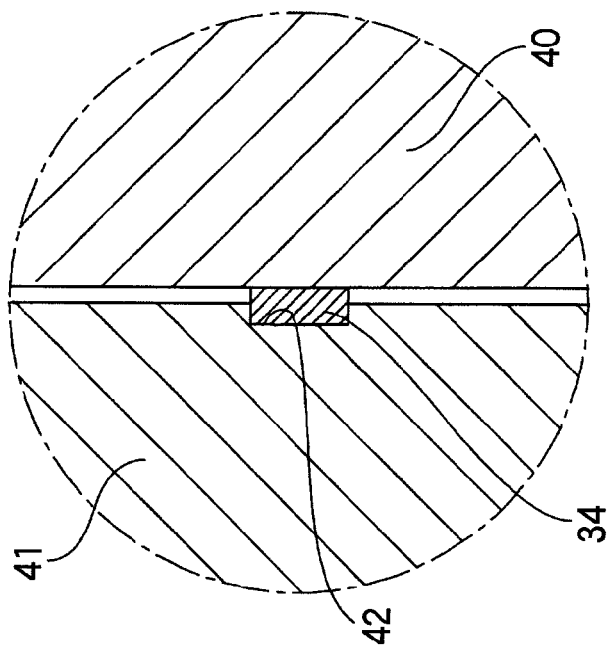
FIG. 13 is an enlarged view showing a portion XIII in FIG. 12.
Figure 13:
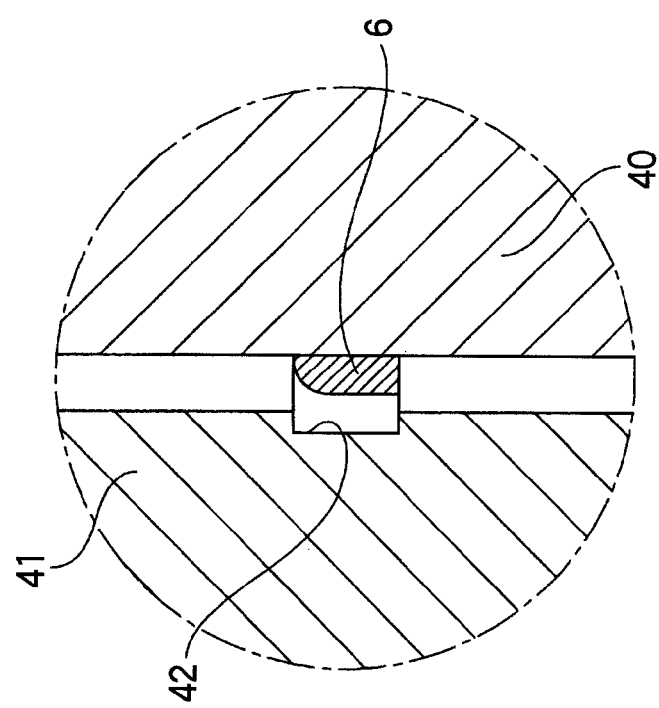

In the successive fourth step, the first intermediate cylindrical material 6 obtained as described above is subjected to cold rolling working. By the plastic working executed by this cold rolling working, the inner and outer diameters and the cross section shape of the first intermediate cylindrical material 6 are regulated and the first intermediate cylindrical material 6 is made into the seal ring 34 shown in FIG. 10(E), the shape accuracy and the dimensional accuracy are set so as to satisfy their requirements. Cold rolling working for working the first intermediate cylindrical material G into the seal ring 34 will be explained in more detail referring to FIGS. 11 to 13.

The first intermediate cylindrical material 6 is supported by an annular die 40 being inwardly fitted to the die 40. This die 40 has inner and outer circumferential faces which are cylindrical faces concentrically formed to each other. This die 40 is rotatably supported by a plurality of supporting rollers not shown (in a state of preventing displacement in radial direction). The respective outer circumferential faces of the supporting rollers come into rolling contact with the outer circumferential face of the die 40. The die 40 has an inner diameter agreeing with the outer diameter of the seal ring 34 (and the first intermediate cylindrical material 6) to be manufactured. In the fourth step described above, this first intermediate cylindrical material 6 is held on the inner circumferential face of the die 40. Under this condition, the first intermediate cylindrical material 6 is pressed by a pushing roller 41 to the inner circumferential face of the die 40 in the direction of the arrow shown in FIG. 11.

In a portion on an outer circumferential face of the intermediate portion of the pushing roller 41 corresponding to the first intermediate cylindrical material 6, a recessed groove 42 is formed all over the circumference. A cross-sectional shape of this recessed groove 42 is rectangle and the width size in the axial direction coincides with a width size of the seal ring 34 to be manufactured. The depth of the recessed groove 42 in the radial direction of the pushing roller 41 is not more than the thickness size of the seal ring 34 to be manufactured. When the first intermediate cylindrical material 6 is worked into the seal ring 34, the above pushing roller 41 is pressed onto an inner circumferential face of the die 40 while rotating. A portion in the circumferential direction of the first intermediate cylindrical material 6 is strongly pressed between the inner circumferential face of the die 40 and an inner face of the recess groove 42.

When the pushing roller 41 presses the portion in the circumferential direction of the first intermediate cylindrical material 6 as described above, while the die 40 is rotating in the same direction of the rolling direction of the pushing roller 41, the die 40 receives a pushing force given by the pushing roller 41. The first intermediate cylindrical material 6 is also rotated together with the die 40. Accordingly, the portion of the first intermediate cylindrical material 6, which is strongly pressed between the inner circumferential face of the die 40 and the inner face of the recessed groove 42, is continuously changed in the circumferential direction. As a result, a cross-section of the first intermediate cylindrical material 6 is changed all over the circumference as shown in FIGS. 13(A) to 13(B). That is, the cross-sectional shape of the first intermediate cylindrical material 6 is plastically deformed so as to agree with the inner circumferential face of the die 40 and the inner face of the recessed groove 42. In this way, the seal ring 34 is formed. That is, at the time of the above described fourth step in which the die 40 and the pushing roller 41 are used, without changing the outer diameter and the outer circumferential face of the first intermediate cylindrical material 6, the inner diameter and the shape of the inner circumferential face are changed so that the material is worked into the sealing 34.

The working method of a seal ring of the present embodiment, includes the following first to fourth steps.

First Step: When the metal plate is punched out, the annular first preliminary intermediate material 3 is obtained.

Second Step: When burring working is executed in which a portion close to the inner diameter of the first preliminary intermediate material 3 is bent in the axial direction at a right angle, the second preliminary intermediate material 5, the cross-sectional shape of which is an L-shape and the entire shape of which is formed into an annular shape, is obtained which includes the cylindrical portion 4 and the outward flange portion 9 bent outside in the radial direction from one axially end portion of this cylindrical portion 4.

Third Step: The outward flange portion 9 of the second preliminary intermediate material 5 is removed and the first intermediate cylindrical material 6 is formed.

Fourth Step: The inner and outer diameters and the cross-sectional shape of the first intermediate cylindrical material 6 are regulated by cold rolling working, so that the seal ring 34 has the required shape accuracy and dimensional accuracy. In this connection, this shape accuracy includes the accuracy of the sectional-shape and also the accuracy related to the entire shape such as the circularity.

Due to the foregoing, the seal ring 34, which is a highly accurate thin ring in which the dimensions of the inner and outer diameters and the accuracy of the cross-sectional shape must be sufficiently ensured, can be manufactured at a low manufacturing cost. That is, in the present embodiment, when the thickness of a metal plate, which becomes the metal plate 1, is selected corresponding to the radial thickness of the seal ring 34 to be manufactured, even the thin seal ring 34 can be manufactured while the necessary accuracy with respect to the thickness is being ensured. In other words, while the accuracy of the inner and outer diameters is being maintained sufficiently high, it is possible to manufacture a highly accurate thin ring having high shape accuracy. Especially, the cold rolling working for working the first intermediate cylindrical material 6 into the seal ring 34 is executed by utilizing the die 40 and the pushing roller 41 as described above. Therefore, the seal ring 34 having high shape accuracy and dimensional accuracy can be highly efficiently manufactured.

At the time of executing the fourth step, the first intermediate cylindrical material 6 is held on the inner circumferential face of the annular die 40. Under this condition, the inner circumferential face of the first intermediate cylindrical material 6 is pressed onto the inner circumferential face of the die 40 by the pushing roller 41. It is preferable that the first intermediate cylindrical material 6, of which outer diameter agrees with the outer diameter of the completed seal ring 34, is formed in the third step. After that, in the fourth step, the inner diameter and the shape of the inner circumferential face are changed without changing the outer diameter of the first intermediate cylindrical material 6. Due to the foregoing, the seal ring 34 having high shape accuracy and dimensional accuracy, can be efficiently manufactured.

Working Method of the Sixth Embodiment

Figure 15:
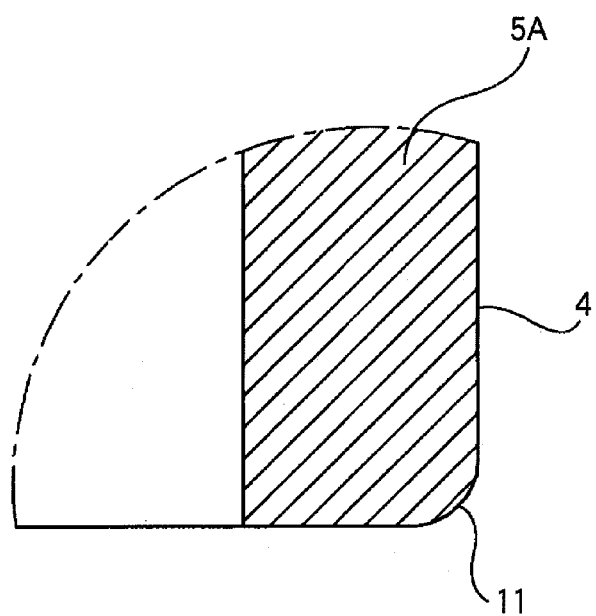
FIG. 15 is an enlarged view of a portion XV in FIG. 14(D).
Figure 16:
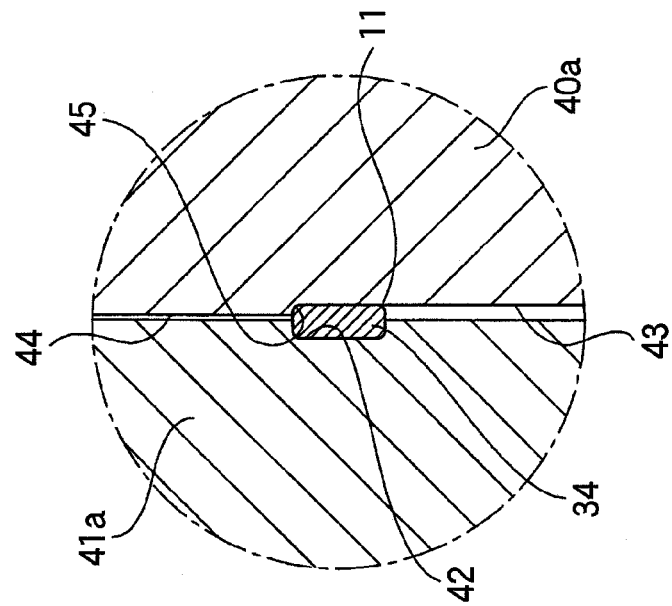
FIG. 16 is an enlarged view made in the same manner as that of FIG. 13.
Figure 16:
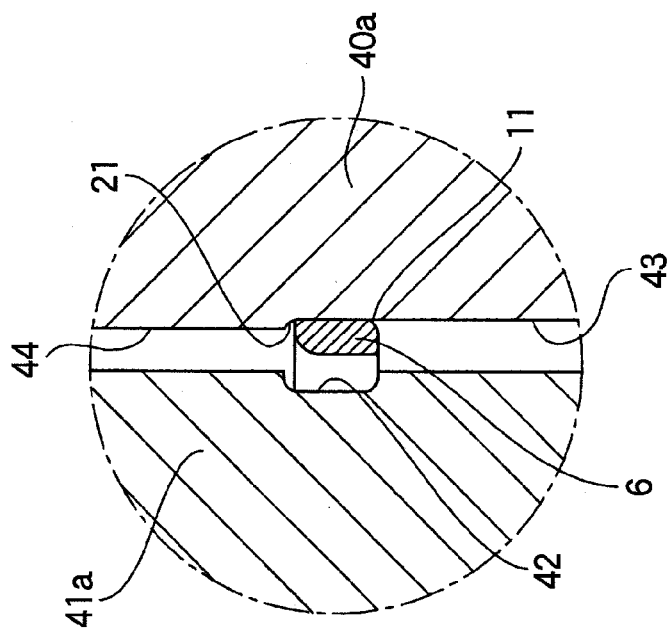

FIGS. 14 to 16 are views showing a working method of the sixth embodiment. In the fifth embodiment described before, four corner portions (both axial end edges of the inner and outer circumferential faces) of the cross-sectional shape of the seal ring 34 obtained are pointed (that is, a radius of curvature of the cross-sectional shape of the portion concerned is very small). On the other hand, in the present embodiment, it is intended that four corner portions of the cross-sectional shape are formed into protruding arc faces (that is, the corners are formed into R-shaped portions). Concerning the R-shaped corner portions at both axial end-edges of the inner circumferential edge, even in the working method of the fifth embodiment described before, when the R-shaped corner portions are provided in the bottom corner portions in the recess groove 42 formed on the outer circumferential face of the pushing roller 41 (that is, when the cross-sectional shape of the bottom face corner portions are formed into recessed arc faces), the four corner portions of the cross-sectional shape can be formed into the protruding arc faces. On the other hand, when the R-shaped corner portions of both axial end edges of the outer circumferential face are formed only out of the shape of the inner circumferential face of the die, it becomes impossible to take out a completed seal ring from the inner circumferential face of the die concerned.

In view of the above circumstances, the working method of the present embodiment has been accomplished. It is intended to realize a working method of taking out the seal ring 34, in which the corner R portions are formed not only at both axial end edges of the inner circumferential face but also at both axial end edges of the outer circumferential face, from the die 40a. In this connection, FIGS. 14(A) to 14(C) showing the manufacturing method of the present embodiment are the same as FIG. 10(A) to 10(C) showing the manufacturing method of the fifth embodiment. FIG. 14(E) is the same as FIG. 10(D) described before except for that the corner-R portion 11 described later is formed at a portion. The present embodiment is characterized in that the preliminary working step shown in FIG. 14(D) is provided in the present embodiment and a shape of the inner circumferential face of the die 40a used for cold rolling working executed in FIG. 14(F) is devised. Illustrations and explanations overlapping those of the working method of the fifth embodiment are omitted or simplified here and only different points from the working method of the fifth embodiment will be mainly explained as follows.

In the manufacturing method of the sixth embodiment which is considered according to the above intention, the corner R portion 11 shown in FIG. 15 is formed in one end edge portion of the outer circumferential face of the first intermediate cylindrical material 6 shown in the upper stage of FIG. 14(E). The step of forming the corner R portion 11 may be executed before the first intermediate cylindrical material 6a is set on the inner circumferential face of the die 40a shown in FIG. 16 (that is, before the first intermediate cylindrical material 6a is inwardly fitted to the annular die 40a). That is, the step of forming the corner R portion 11 may be executed in any of between FIGS. 14(B) and 14(C) between FIGS. 14(C) and 4(E) and between FIGS. 14(E) and 14(F). In the present embodiment, before the second preliminary intermediate material 5 shown in FIG. 14(C) is worked to be the first intermediate cylindrical material 6 shown in FIG. 14(E), the corner R portion 11 shown in FIG. 15 is formed at a forward end edge portion of the outer circumferential face of the cylindrical portion 4 at the step shown in FIG. 14(D). The corner R portion 11 is formed as follows. Under the condition that the cylindrical portion 4 is outwardly fitted to a cylindrical core, an annular press die, on the forward end face of the entire circumference of which a pressing face of a recess arc face is formed, is pressed against the forward end edge portion of the outer circumferential face of the cylindrical portion 4, and the forward end edge portion of the outer circumferential face can be plastically deformed.

The third preliminary intermediate material 5A shown in FIG. 14(D), in which the corner R portion 11 is formed in the forward end edge portion of the outer circumferential face of the cylindrical portion 4 in the preliminary working step, is subjected to punching working by a press working in the same manner as in the fifth embodiment. Then, the outward flange 9 is removed and the first intermediate cylindrical material 6 shown in the upper stage portion of FIG. 14(E) is obtained. The corner R portion described above is provided at one axial end edge of the outer circumferential face in both axial end edges of the inner and outer circumferential faces of the first intermediate cylindrical material 6. On the other hand, the other axial end edge of the outer circumferential face and both axial end edges of the inner circumferential face are left being pointed. Therefore, in the fourth step shown in FIGS. 14(E) to 14(F), when the inner and outer diameters and the cross-sectional shape of the first intermediate cylindrical material 6 are regulated, the corner R portions are formed at the other axial end edge of the outer circumferential face and both axial end edges of the inner circumferential face. In this way, obtained is the seal ring 34 in which the corner R portions are formed in all four corner portions and has the high cross-sectional shape accuracy and high dimensional accuracy.

In order to obtain the above seal ring 34, an inner circumferential face of the annular die 40a used for the fourth step is formed into a stepped cylindrical face on which the large diameter portion 43 and the small diameter portion 44, which are cylindrical faces concentric to each other, are continued by the step portion 45 as shown in FIG. 16. This step portion 45 is a recessed arc face, the cross section of which is one fourth arc shape. Concerning both axial end corner portions of the bottom portion of the recessed groove 42a formed on the outer circumferential face of the pressing roller 41a, the cross-sectional shape is formed into a recessed arc face of one fourth arc. The constitution of the other portions of the cold rolling working device is the same as that of the working method of the fifth embodiment described before.

In the present embodiment, the first intermediate cylindrical material 6 is inwardly fitted to the die 40a described above while the other axial end edge (the sharp edge) of the outer circumferential face of the first intermediate cylindrical materiel 6 is being opposed to the step portion 45 which is the recessed arc face provided on the inner circumferential face of the die 40a. In the same manner as that of the fifth embodiment, the first intermediate cylindrical material 6 is pressed against the inner circumferential face of the die 40a by the pressing roller 41a described before. As a result of this pressing working, the cross-sectional shape of the first intermediate cylindrical material 6 is changed from FIG. 16(A) to FIG. 16(B) all over the circumference. That is, the cross-sectional shape of this first intermediate cylindrical material 6 is plastically deformed so as to agree with the inner circumferential face of the die 40a and the inner face of the recessed groove 42. In this way, the seal ring 34 is formed. At this time, a shape of the recessed arc face composing both axial end corner portions of the bottom portion of the recessed groove 42 is transferred onto both end edge portions of the first intermediate cylindrical material 6 and a shape of the step portion 45 is transferred onto the other axial end edge portion on the outer circumferential face of the first intermediate cylindrical material 6. The corner R portion 11 is originally formed in one axial end edge portion of the outer circumferential face of the first intermediate cylindrical material 6. Therefore, in both axial end edge portions of the inner and outer circumferential faces of the seal ring 34 obtained as a result of the fourth step, the corner R portions having a cross-sectional shape of one fourth arc are respectively formed.

According to the working method of the seal ring of the present embodiment, the seal ring 34 of high quality, in which the corner R portions (the protruding arc shape portions), the cross-sectional shape of which is one fourth arc shape, are respectively formed in both axial end edge portions of the inner and outer circumferential faces, can be efficiently manufactured by an industrial method.

That is, when the corner R portions are simply formed in both axial end edge portions on the inner and outer circumferential faces, it is possible to form the corner R portions in such a manner that the seal ring 34 made by the working method of the fifth embodiment is subjected to machining such as lathe turning or grinding working. However, according to the method in which the corner R portions are formed by machining as described above, the manufacturing cost is raised and the cost of the seal ring is raised. Accordingly, it is not avoidable from increasing of the manufacturing cost of a machine such as a transmission for an automobile.

On the other hand, according to the working method of the present embodiment, after the first step and before the fourth step, that is, in any of between the first step and the second step, between the second step and the third step and between the third step and the fourth step, the preliminary forming, by which the cross-sectional shape of at least one end edge in both end edges of the outer circumferential face is formed into a protruding arc shape of one fourth arc shape, is conducted on the intermediate material (one of the first preliminary intermediate material 3 to the first intermediate cylindrical material 6). Accordingly, it is possible to efficiently manufacture a seal ring 34 of high quality, the end edges of which are not sharp.

Manufacturing Method of the Seventh Embodiment

Next, explanations will be made into a working method of the seventh embodiment in which a seal ring is subjected to the abrasion resistance treatment. The seal ring 34 worked by any of the working methods of the first to the sixth embodiment is not subjected to heat treatment after completing the press working in order to prevent the seal ring 34 from being deformed by heat treatment such as quenching and tempering. Therefore, work hardening, which is caused when a metal plate is worked, is anticipated. In the working methods of the first to the fourth embodiment, work hardening is caused by press working. In the working methods of the fifth and the sixth embodiment, in addition to work hardening caused by press working, work hardening is caused by cold rolling working. Even when work hardening is caused, since the seal ring 34 composes a floating seal, no problems are caused when the seal ring 34 is usually used. However, in the case where the drawn cup needle roller bearing 30 is used under a severe condition, it is desirable that the seal ring 34 is subjected to the abrasion resistance treatment.

Concerning the treatment for improving abrasion resistance, in order to ensure the shape accuracy and the dimensional accuracy required for the thin seal ring 34, it is desirable to use a method in which no deformation is caused by the treatment for improving abrasion resistance. Specifically, it is considered to use the method of nitriding. Examples of nitriding are: gas nitriding, salt bath nitriding and ion nitriding. It is desirable to use Nv Nitriding Process (Brand Name of Air Water Co.) in which the treatment can be executed at a relatively low temperature.

Nv nitriding process is executed as follows. For the seal ring 34 formed into a cylindrical shape by the working method of any of the first to the sixth embodiment, fluoridizing process is executed by using, for example, fluorine gas such as NF3. After that, gas nitriding is executed so as to form a nitriding layer on a surface of the seal ring 34. By the fluoridizing process, Cr oxide, which obstructs nitriding, is removed from a surface of the work to be treated and a fluoridized layer, which activates the surface of the work to be treated, is formed. Due to the foregoing, even when nitriding is executed at a low temperature of about 400° C., a relatively uniform nitriding layer is formed. As described above, both fluoridizing and nitriding processes are executed at a low temperature. Therefore, the seal ring 34 is not deformed. Accordingly, the high dimensional accuracy and the high shape accuracy of the seal ring 34 worked by the working methods of the first to the sixth embodiment can be maintained and it is possible to manufacture the highly accurate seal ring 34. When the seal ring 34 is subjected to Nv nitriding process as described above, it is possible to form a nitriding layer having the surface hardness of Hv400 or more and the thickness of 5 to 20 μm. Accordingly, while the deformation of the seal ring 34 caused in the treatment for improving abrasion resistance is being prevented, the abrasion resistance property can be enhanced.

In this connection, it should be noted that the present invention is not limited to the above specific embodiments. Variations and improvements can be appropriately made.

In the present embodiment, the outer ring shell 31 is used which includes a raceway surface 31a formed on the inner circumferential face and also includes inward flange portions 31b, 31c formed in both end portions. However, it is possible to use an inner ring shell which includes a raceway surface formed on the outer circumferential face and also includes outward flange portions formed in both end portions. In this case, the seal ring is provided outside the shell between the end face of the cage and the outward flange portion.

EXAMPLES

Next, a comparison test was made with respect to the dynamic torque and the quantity of lubricant passing through a needle bearing by using a drawn cup needle roller bearing having a seal ring of the present invention and by using a conventional plain bearing (a bush). In the comparison test of the dynamic torque, the height of the cross section of the bearing was 1.5 mm with respect to both bearings and the test load was 500N.

Figure 17:
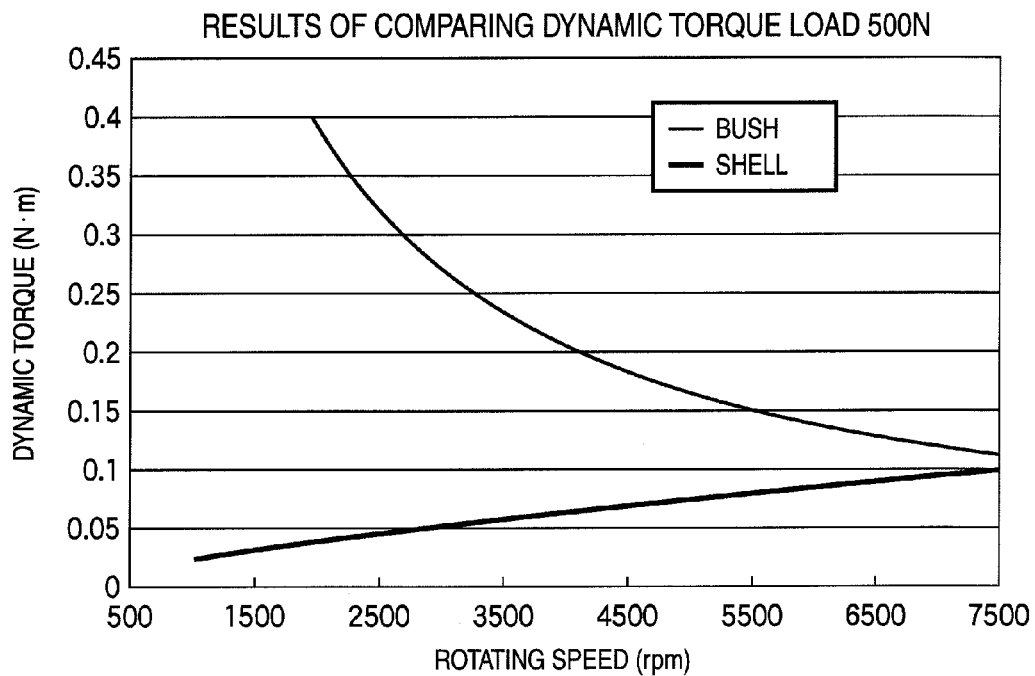
FIG. 17 is a graph showing results of the measurement of dynamic torque of a drawn cup needle roller bearing and a bush.

In the comparison test of the quantity of lubricant passing through the bearing, the drawn cup needle roller bearing in which a height of the cross section thereof was 1.5 mm and a gap between the seal ring and a shaft was 0.06 mm as the upper limit, was used. Further, the bush, in which the height of the cross section was 1.5 mm and the gap of which was 0.08 mm as the upper limit, was used. The rotating speed of the shaft was 0 to 3000 rpm. Lubricant was JWS3309 (manufactured by Exxon Mobil Co.). The oil pressure was 30 kPa. The oil temperature was approximately 80° C. FIG. 17 shows a result of the measurement of the dynamic torque and FIG. 18 shows a result of the measurement of the quantity of lubricant passing through the bearing.

As shown in FIG. 17, in the comparison test of the dynamic torque, it can be understood that the dynamic torque can be reduced by using the drawn cup needle roller bearing. Especially, it can be confirmed that the effect of reducing the dynamic torque is high in the low speed region where the fuel consumption efficiency is low.

Figure 18:
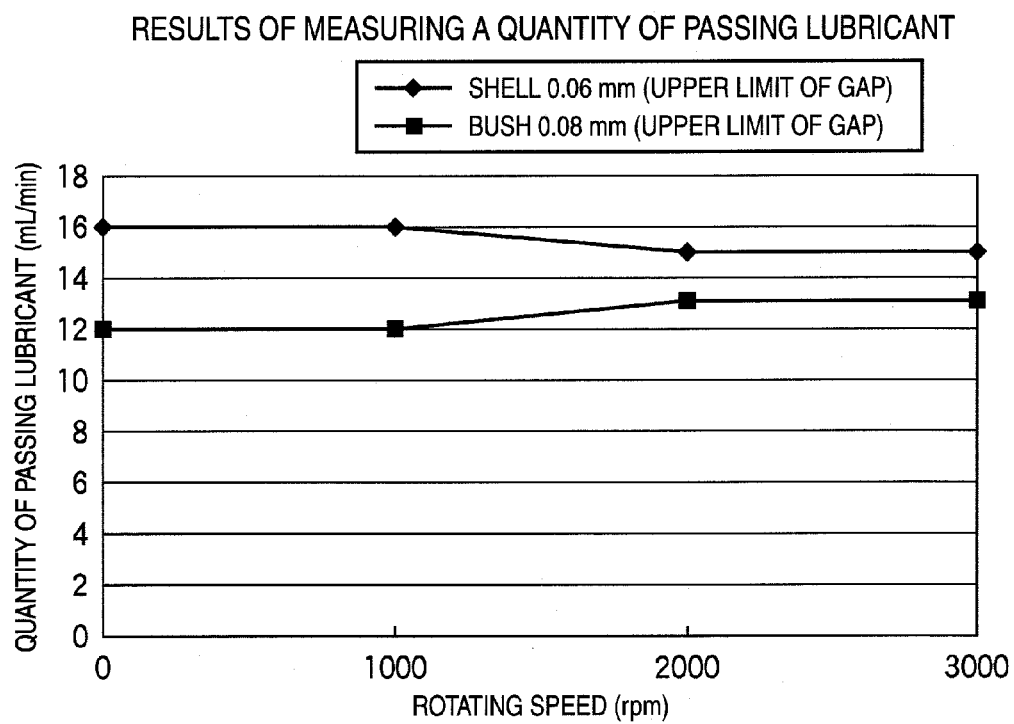
FIG. 18 is a graph showing results of the measurement of a quantity of lubricant passing through a drawn cup needle roller bearing and a bush.

As shown in FIG. 18, in the comparison test of the quantity of lubricant passing through the bearing, only the quantity of lubricant passing through a bearing of the drawn cup needle roller bearing, the gap of which is 0.06 mm, is larger than the quantity of lubricant passing through the bearing of the bush, the gap of which is 0.08 mm, by 4 mL at the maximum. Therefore, the quantity of lubricant passing through the bearing can be regulated at the same value as that of the bush.

Figure 19:
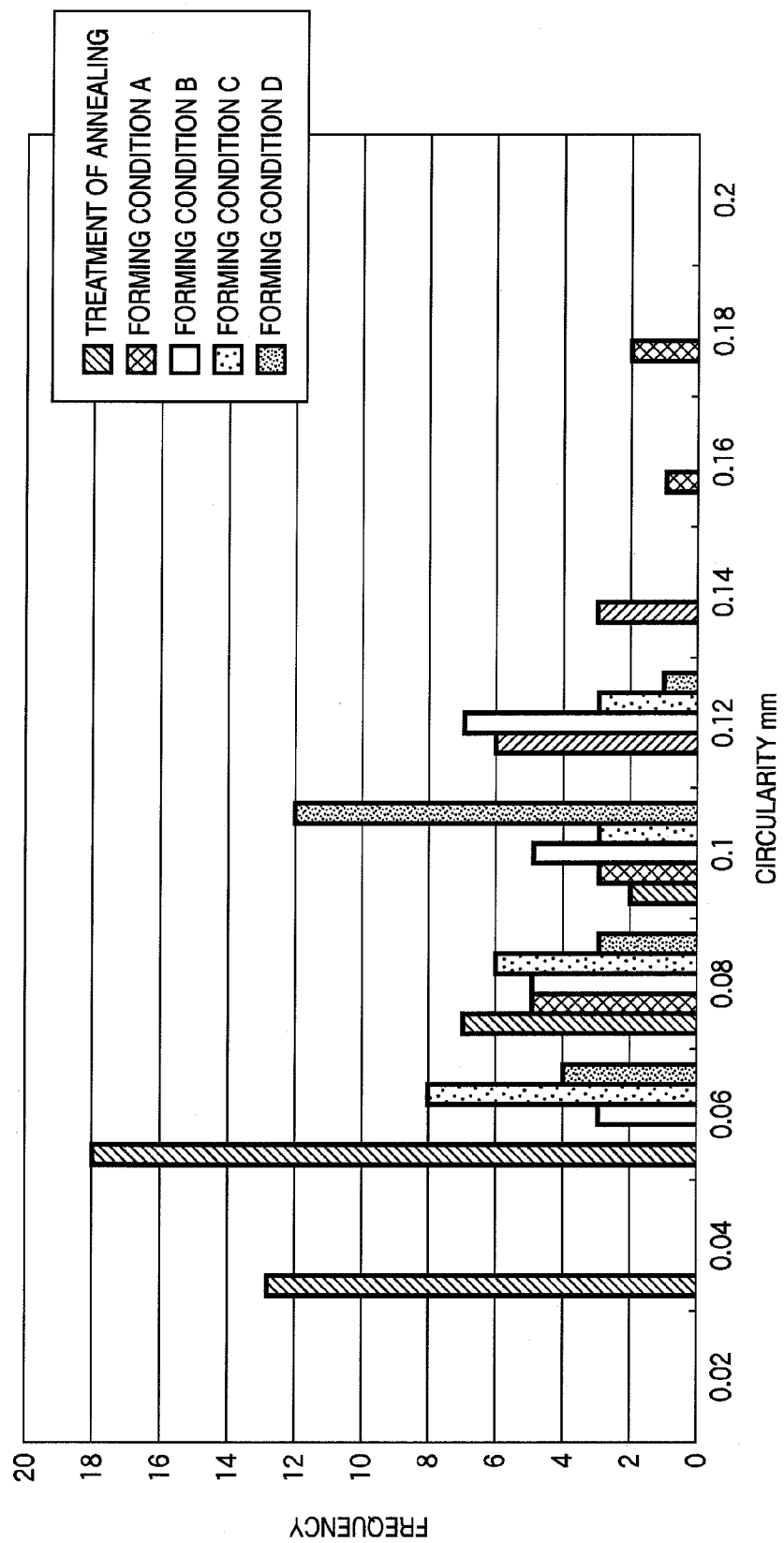
FIG. 19 is a graph in which the outer diameter circularity of a cage is compared to each other with respect to a forming condition and also with respect to whether or not annealing is executed.

Next, a material was used in which glass fiber was mixed by 25% with polyamide 46, which is capable of being used at a high temperature and also capable of being easily manufactured. While the forming condition was being changed, cages made of resin of which inner diameter was 45 mm, were formed by means of injection molding. The circularity of the outer diameter was compared with respect to the forming conditions and with respect to whether or not the treatment of annealing was executed. FIG. 19 shows the result of the test.

Here, the test was made in such a manner that four types of cages made of resin were formed in different conditions and one type of the formed cage was subjected to annealing. In the treatment of annealing, an annealing shaft of 45.22 mm was inserted into the inner diameter of the cage made of resin and held for three hours at 170° C. The circularity was measured by using a tool microscope in such a manner that the outer diameter on the gate side and the outer diameter on the ejector side were respectively measured at eight points and the average values were found. In this case, concerning the cages made of resin, the number of the cages not subjected to annealing was ten and the number of the cages subjected to annealing was twenty.

As shown in FIG. 19, the cages made of resin not subjected to the treatment of annealing were out of the tolerance (±0.1 mm) although the deviation was slightly different from each other according to the forming condition. On the other hand, all the cages made of resin subjected to the treatment of annealing were in the tolerance. Therefore, it can be understood that the treatment of annealing is effective for enhancing the circularity.

Figure 20:
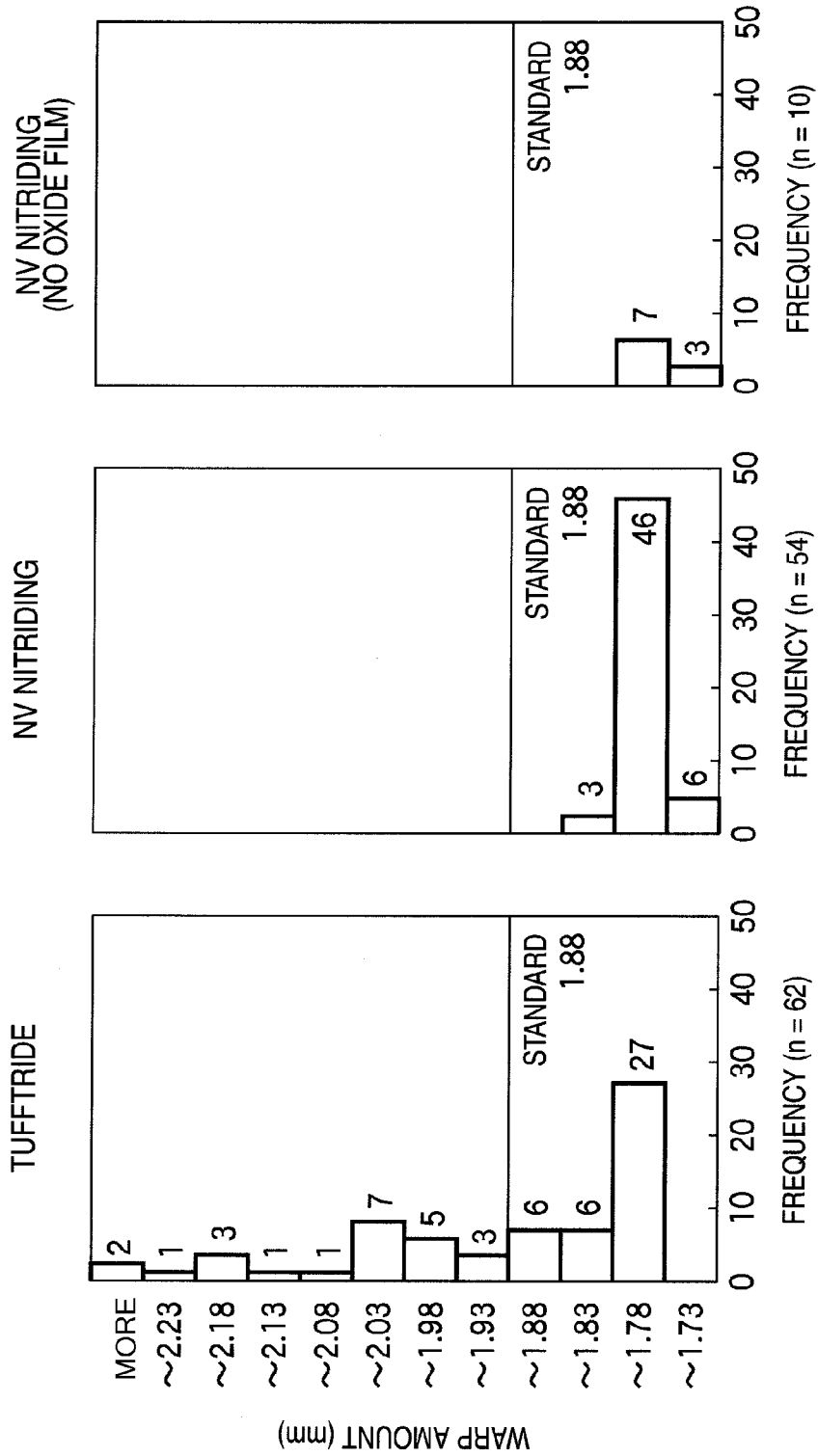
FIG. 20 is a graph showing an amount of warp of a seal ring caused when the seal ring is subjected to a treatment for improving abrasion resistance.
Figure 21:
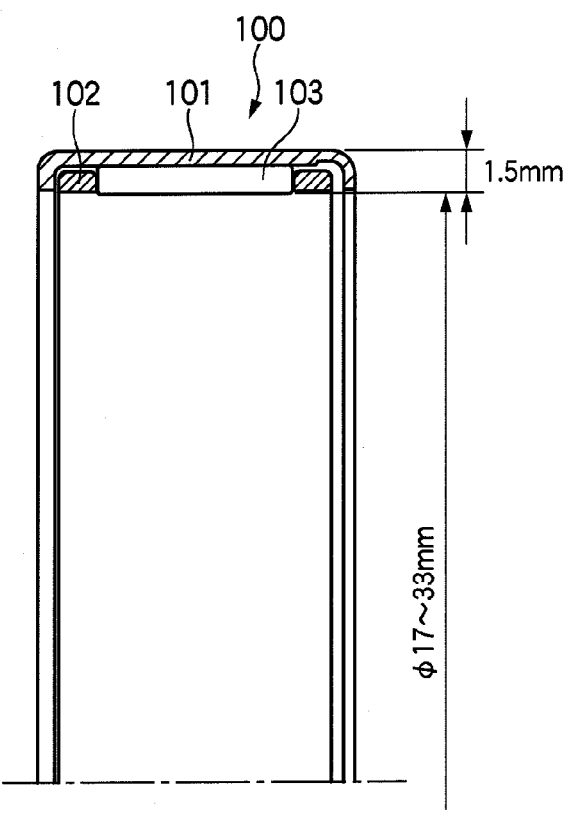
FIG. 21 is a sectional view showing a conventional drawn cup needle roller bearing.
Figure 22:
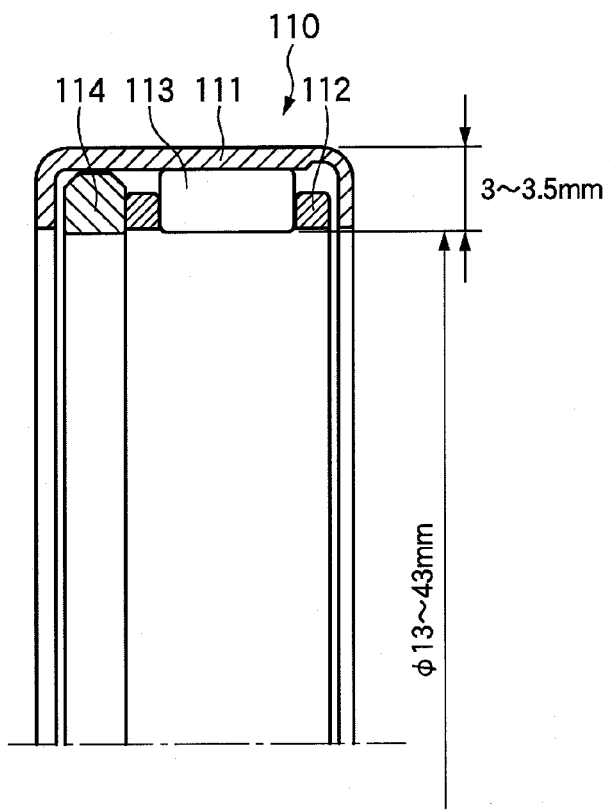
FIG. 22 is a sectional view showing another conventional drawn cup needle roller bearing having a seal ring which has been subjected to cutting working.

Next, tests of the warp deformation were made in three cases of the treatment for improving abrasion resistance including Tufftride (salt bath nitriding), NV nitriding and NV nitriding (no oxide film). FIG. 20 shows amounts of the warp deformation in the above treatment. As a result, the following was found. In any case of the treatment of NV nitriding, NV nitriding (no oxide film) and Alcoa VG7, amounts of the warp deformation of all products were in the range stipulated in the standard, that is, the results were preferable.

The present application of patent is based on the Japanese Patent Application (Patent Application No. 2006-159699) filed on Jun. 8, 2006 and also based on the Japanese Patent Application (Patent Application No. 2007-010153) filed on Jan. 19, 2007 and the contents are taken in here as reference.

The invention claimed is:

1. A method of manufacturing a drawn cup needle roller bearing having a seal ring, the drawn cup needle roller bearing comprising:
   a shell having a raceway surface on a circumferential face and also having flange portions in both end portions;
   a cage having a plurality of pockets in a circumferential direction;
   a plurality of needles retained in the pockets so that the needles freely rotate along the raceway surface; and
   a cylindrical seal ring arranged between an end face of the cage and the flange portion of the shell, wherein the seal ring composes a floating seal and a height of a cross section of the needle roller bearing is 1.0 to 3.5 mm,
   the method comprising:
   forming the seal ring by a press working, the press working comprising:
   piercing a metal plate to form a first preliminary intermediate material having a first circular hole;
   bending the periphery of the first circular hole so as to be right angle with respect to the metal plate all over the circumference to form a second preliminary intermediate material having a cylindrical portion;
   pressing the cylindrical portion in an axial direction, in a state that an outer circumferential face of the cylindrical portion is held by a die and an inner circumferential face of the cylindrical portion is not held, to regulate an outer diameter and an axial dimension of the cylindrical portion to predetermined values and to cause the excessive portion to be swelled radially inward, thereby obtaining a first intermediate cylindrical material;

pushing an ironing punch having an outer diameter, which agrees with an inner diameter of the seal ring to be manufactured, into a radially inner side of the first intermediate cylindrical material from one axial end of the first intermediate cylindrical material, while restricting the outer circumferential face of the first intermediate cylindrical material so that the outer diameter of the first intermediate cylindrical material does not expand, to collect the excessive portion existing on the inner circumferential face portion of the first intermediate cylindrical material to the other axial end of the first intermediate cylindrical material, thereby forming a second intermediate cylindrical material having an inwardly flange-shaped excessive flange portion formed on the inner circumferential face of the portion on the other axial end, inserting a punch having an outer diameter, which agrees with the inner diameter of the seal ring to be manufactured, into the second intermediate cylindrical material to remove the excess flange portion, thereby obtaining the seal ring; and after the bending, cutting off the cylindrical portion, the first intermediate cylindrical material, the second intermediate cylindrical material or the seal ring from the metal plate.

2. The method according to claim 1, wherein after completing the press working on the seal ring, the seal ring is subjected to a treatment for improving abrasion resistance.

3. The method according to claim 1, wherein the cage is made of resin.

4. The method according to claim 1, wherein the metal plate is a long metal plate which is delivered from an uncoiler and wound up by a recoiler, and the metal plate is successively fed according to the progress of the working of the seal ring without being cut along its width, wherein the cutting off comprises forming a second circular hole, which is larger than the first circular hole in the metal plate, and punching out the cylindrical portion, the first intermediate cylindrical material or the second intermediate cylindrical material from the inside of the second circular hole, and after the metal plate, and punching out the cylindrical portion, the first intermediate cylindrical material or the second intermediate cylindrical material from the inside of the second circular hole is subjected to a predetermined working, it is fitted into the inside of the second circular hole again and is sent to a working device for executing the next working in accordance with the feed of the metal plate.

* * * * *